(12) United States Patent
Nishihara et al.

(10) Patent No.: US 8,301,039 B2
(45) Date of Patent: Oct. 30, 2012

(54) DELAY PROCESSING APPARATUS, SIGNAL AMPLIFICATION APPARATUS, OPTO-ELECTRIC CONVERSION APPARATUS, ANALOG-DIGITAL CONVERSION APPARATUS, RECEIVING APPARATUS, AND RECEIVING METHOD

(75) Inventors: Masato Nishihara, Kawasaki (JP); Tomoo Takahara, Kawasaki (JP); Hisao Nakashima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 323 days.

(21) Appl. No.: 12/620,540

(22) Filed: Nov. 17, 2009

(65) Prior Publication Data
US 2010/0178065 A1 Jul. 15, 2010

(30) Foreign Application Priority Data
Jan. 9, 2009 (JP) ................................. 2009-003682

(51) Int. Cl.
*H04B 10/06* (2006.01)

(52) U.S. Cl. ........ 398/209; 398/202; 398/208; 398/205; 398/206; 398/204; 398/210; 398/212; 398/188; 398/213; 375/229; 375/346; 375/350; 375/329; 375/279

(58) Field of Classification Search ............... 398/202, 398/203, 204, 205, 208, 209, 210, 206, 207, 398/211, 212, 213, 214, 188, 183, 81, 158, 398/159, 33, 38, 135, 136.137, 161, 162, 398/25, 26, 27, 65, 152; 375/329, 279, 295, 375/326, 229, 350, 346, 348
See application file for complete search history.

(56) References Cited

U.S. PATENT DOCUMENTS
| 7,315,575 | B2 | 1/2008 | Sun et al. | |
|---|---|---|---|---|
| 2009/0208224 | A1* | 8/2009 | Kikuchi | 398/141 |
| 2010/0054761 | A1* | 3/2010 | Chen et al. | 398/212 |

OTHER PUBLICATIONS

Tsukamoato, Satoshi et al.,"Optical Homodyne Receiver Comprising Phase and Polarization Diversities with Digital Signal Processing", Sep. 24-28, 2006, 19-20, 55-56.

* cited by examiner

*Primary Examiner* — Hanh Phan
(74) *Attorney, Agent, or Firm* — Fujitsu Patent Center

(57) ABSTRACT

A delay device that provides a delay amount to at least one of the in-phase signal and the quadrature signal, and a delay control section that controls the delay amount provided by the delay device based on a quality of the signals when the in-phase signal and the quadrature signal, to the at least one of which the delay amount is provided, at the delay device are converted into digital signals by the analog-digital converter, and the digital signal processing is carried out at the processor are provided. Thereby, the signal quality of recovered data at a receiving end of a multi-level phase modulation communication system is improved.

20 Claims, 20 Drawing Sheets

US 8,301,039 B2

DELAY PROCESSING APPARATUS, SIGNAL AMPLIFICATION APPARATUS, OPTO-ELECTRIC CONVERSION APPARATUS, ANALOG-DIGITAL CONVERSION APPARATUS, RECEIVING APPARATUS, AND RECEIVING METHOD

CROSS-REFERENCE TO RELATED APPLICATION(S)

This application is based upon and claims the benefit of priority of the prior Japanese Patent Application No. 2009-003682, filed on Jan. 9, 2009, the entire contents of which are incorporated herein by reference.

FIELD

The present application relates to a delay processing apparatus, a signal amplification apparatus, an opto-electric conversion apparatus, an analog-digital conversion apparatus, a receiving apparatus, and a receiving method. The present application may be applied to an apparatus that receives multi-level phase modulated optical signals, for example.

BACKGROUND

Recently, as the transmission traffic increases, there are increasing needs for introducing optical transmission systems of the next generation which have transmission capacities of 40 Gbit/s or greater. Various modulation schemes having higher spectral efficiencies, optical signal-to-noise ratio (OSNR) tolerance, and non-linearity tolerance as compared to the Non Return to Zero (NRZ) modulation scheme that has been employed in conventional system are viewed as promising for realizing such systems.

Among them, multi-level phase modulation schemes, such as (differential) quadrature phase-shift keying ((D)QPSK) modulation scheme, are regarded as promising as modulation schemes for optical transmission systems of the next generation. This is because multi-level phase modulation schemes have properties, such as higher dispersion tolerance, higher polarization mode dispersion (PMD) tolerance, and narrower spectrum. As a technique to realize further improvements in the characteristics (OSNR tolerance, chromatic dispersion tolerance) of such multi-level phase modulation schemes, a digital coherent receiving scheme that combines the coherent reception with digital signal processing has been proposed (for example, Patent Reference 1, Non-Patent Reference 1, or the like).

(Patent Reference 1) U.S. Pat. No. 7,315,575
(Non-Patent Reference 1) S. Tsukamoto, et al., "Optical Homodyne Receiver Comprising Phase and Polarization Diversities with Digital Signal Processing," Mo4.2.1, European Conference on Optical Communication 2006, 2006"

It is desired that the signal quality of data recovered at the receiver side of a multi-level phase modulation communication system having a transmission capacity of 40 Gbit/s or higher (baud rate of 20 Gbit/s or more) is further enhanced.

Accordingly, one object of the present application is to enhance the signal quality of data recovered on the side that receives multi-level phase modulated signal lights.

Note that, other than the above-identified object, it can be regarded as an object of the present invention to provide advantages and effects that can be obtained by the best modes to implement the invention described below but cannot be obtained with conventional techniques.

SUMMARY

For example, the following proposed techniques are used.
(1) A delay processing apparatus that is used with an analog-digital converter that converts, into digital signals, an in-phase signal and a quadrature signal that are obtained by demodulating multi-level phase modulated light, and a processor that carries out digital signal processing on the digital signals from the analog-digital converter to recover data, the delay processing apparatus comprising: a delay device that provides a delay amount to at least one of the in-phase signal and the quadrature signal; and a delay control section that controls the delay amount provided by the delay device based on a quality of the signals when the in-phase signal and the quadrature signal, to the at least one of which the delay amount is provided, at the delay device are converted into digital signals by the analog-digital converter, and the digital signal processing is carried out at the processor may be employed.

(2) A signal amplification apparatus that is used with an analog-digital converter that converts, into digital signals, an in-phase signal and a quadrature signal that are obtained by demodulating multi-level phase modulated light, and a processor that carries out digital signal processing on the digital signals from the analog-digital converter to recover data, the signal amplification apparatus comprising: an amplification section that carries out amplification processing independently on the in-phase signal and the quadrature signal in analog electric signals; a delay device that provides a delay amount to at least one of the in-phase signal and the quadrature signal at the previous stage or the subsequent stage of the amplification section; and a delay control section that controls the delay amount provided by the delay device based on a quality of the signals when the in-phase signal and the quadrature signal, to the at least one of which the delay amount is provided, at the delay device are converted into digital signals by the analog-digital converter, and the digital signal processing is carried out at the processor may be employed.

(3) An opto-electric conversion apparatus that is used with an analog-digital converter that converts, into digital signals, an in-phase signal and a quadrature signal that are obtained by demodulating multi-level phase modulated light, and a processor that carries out digital signal processing on the digital signals from the analog-digital converter to recover data, the opto-electric conversion apparatus comprising: an opto-electric conversion section that converts the in-phase signal and the quadrature signal into respective electric signals through opto-electric conversion processing; a delay device that provides a delay amount to at least one of the in-phase signal and the quadrature signal at the previous stage or the subsequent stage of the opto-electric conversion processing; and a delay control section that controls the delay amount provided by the delay device based on a quality of the signals when the in-phase signal and the quadrature signal, to the at least one of which the delay amount is provided, at the delay device are converted into digital signals by the analog-digital converter, and the digital signal processing is carried out at the processor may be employed.

(4) An analog-digital conversion apparatus that are used with a processor that carries out digital signal processing on the digital signals from the analog-digital converter to recover data, the analog-digital conversion comprising: an analog-digital conversion section that converts the in-phase signal and the quadrature signal into respective digital electric signals through analog-digital conversion processing; a delay device that provides a delay amount to at least one of the in-phase signal and the quadrature signal of the analog electric signals at the previous stage or the subsequent stage of the analog-digital conversion processing; and a delay control section that controls the delay amount provided by the delay device based on a quality of the signals when the in-phase signal and the quadrature signal, to the at least one of which the delay amount is provided, at the delay device is converted into the digital signals by the analog-digital conversion section, and the digital signal processing is carried out at the processor may be employed.

(5) A receiving apparatus, comprising: a receiver unit that receives a multi-level phase modulated light and outputs an in-phase signal and a quadrature signal; a delay device that provides a delay amount to at least one of the in-phase signal and the quadrature signal from the receiver section, a delay control section that controls the delay amount provided by the delay device based on a quality of the signals when the at least one of the in-phase signal and the quadrature signal to which delay amount is provided at the delay device is converted into the digital signals by analog-digital conversion section, and the digital signal processing is carried out at a processor may be employed.

(6) A receiving apparatus, comprising: a front-end section that receives a multi-level phase modulated optical signal and outputs an in-phase signal and a quadrature signal of an analog electric signal; a delay device that provides a delay amount to at least one of the in-phase signal and the quadrature signal; a plurality of analog-digital conversion section that input the in-phase signal and the quadrature signal, the at least one of which is provided with the delay amount by the delay device; a digital signal processing section that carries out digital signal processing on the output from the analog-digital conversion section; and a delay control section that controls the delay amount at the delay device based on a result of the digital signal processing at the digital signal processing section may be employed.

(7) A receiving apparatus, comprising: a receiver unit that receives a multi-level phase modulated light and outputs an in-phase signal and a quadrature signal as optical signals; an opto-electric conversion section that converts the in-phase signal and the quadrature signal of the optical signals output from the receiver section into respective analog electric signals through opto-electric conversion processing; an amplification section that carries out amplification processing on the in-phase signal and the quadrature signal of the analog electric signals from the opto-electric conversion section; a delay device that provides a delay amount to at least one of the in-phase signal and the quadrature signal from the reception section; a temperature monitor that monitors temperatures at the opto-electric conversion section and the amplification section; and a delay control section that stores the temperatures at the opto-electric conversion section and the amplification section, and information on the delay amount to be set to at least one of the in-phase signal and the quadrature signal at the delay device in accordance with a gain at the amplification section, retrieves, from the store, the information on the delay amount corresponding to a monitor result from the temperature monitor and the gain at the amplification section, and controls the delay device in accordance with the retrieved delay amount may be employed.

(8) A receiving method, comprising: receiving a multi-level phase modulated light and outputs an in-phase signal and a quadrature signal; providing a delay amount to at least one of the in-phase signal and the quadrature signal; converting the in-phase signal and the quadrature signal, to the at least one of which the delay amount is provided, into digital signals, and carrying out signal processing, and controlling the provided delay amount based on a result of the signal processing may be employed.

According to the techniques disclosed, the signal quality of recovered data may be improved at the receiving end of multi-level phase modulated optical signals.

Additional objects and advantages of the invention (embodiment) will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

DESCRIPTION OF EMBODIMENT(S)

Figure 1:
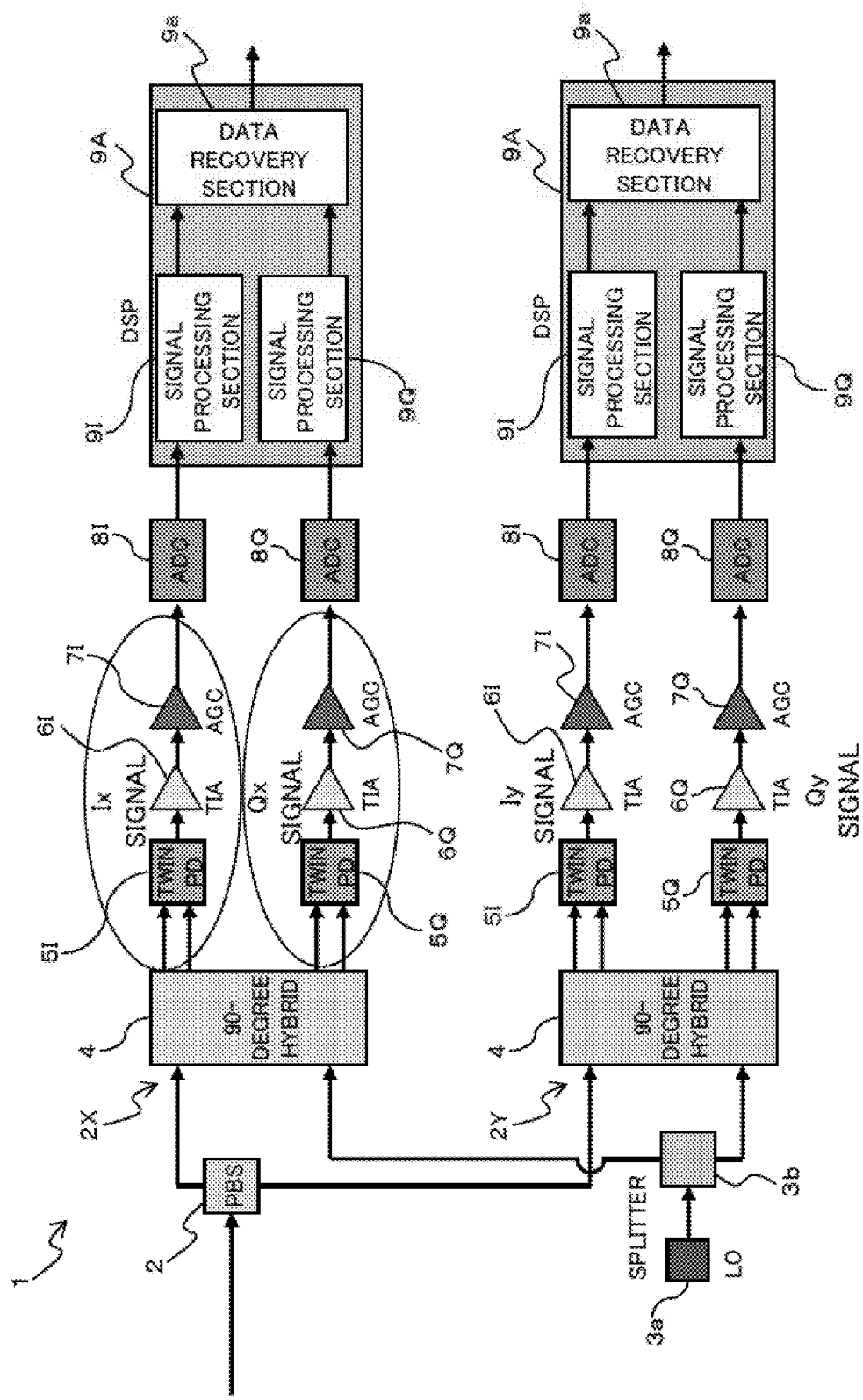
FIG. 1 is a diagram illustrating the basic configuration of a coherent receiver.

Hereunder is a description of embodiments with reference to the drawings. In the drawings, the elements referenced to by the same reference symbols denote like elements. The embodiments that will be described are merely exemplary, and it is not intended to exclude various variations and applications of techniques that are not described. In other words, the embodiments can be practiced in various modifications without departing from the spirit thereof.

First Embodiment

Comparative Example

An example of the configuration of a coherent receiver 1 is illustrated in FIG. 1. The coherent receiver 1 illustrated in FIG. 1 receives received signals (optical signals) containing data in each of the orthogonal polarization components, and carries out signal demodulation processing or the like on the each of the polarization components at respective signal demodulation processing systems. A polarization beam splitter (PBS) 2 separates received signals containing data into two linearly polarized components that are orthogonal with each other, and directs them into 90-degree hybrid circuit 4 in a signal demodulation processing system 2X for the X-polarization component and a signal demodulation processing system 2Y for the Y-polarization component.

A local oscillator (LO) 3a outputs locally-oscillated light. A splitter 3b splits the locally-oscillated light from the local oscillator 3a into two, and directs them to the 90-degree hybrid circuit 4 in the signal demodulation processing system 2X for the X-polarization component and the signal demodulation processing system 2Y for the Y-polarization component.

The signal demodulation processing systems 2X and 2Y demodulate a multi-level phase modulated optical signal that has been modulated into the X-polarization component and the Y-polarization component, respectively, and recover the data. For this purpose, the signal demodulation processing systems 2X and 2Y include equivalent elements (reference symbols 4-9). Hereinafter, although the explanations of elements 4-9 will be given with reference to the signal demodulation processing system 2X, the similar description can be applied to the signal demodulation processing system 2Y.

Note that the suffix characters "I" and "Q" appended to the suffixes may be omitted when reference symbols are correctively used.

The 90-degree hybrid circuit 4 mixes an optical signal of the X-polarization component that is a received signal and locally-oscillated light that is shifted by a 90-degree phase with respect to the optical signal, and outputs a real part component (in-phase signal, Ix signal) and an imaginary part component (quadrature signal, Qx signal) of the received signal. As illustrated in FIG. 1, in the 90-degree hybrid circuit 4 that processes a QPSK signal, an in-phase signal and a quadrature signal are output as two outputs of signal light and phase conjugate light.

A twin photo detector (PD) 5I receives the in-phase signal of the two outputs, and outputs an electric signal (current signal) of the phase modulation component Ix of the X-polarization component. Similarly, a twin PD 5Q receives the quadrature signal of the two outputs, and outputs an electric signal of the phase modulation component Qx of the X-polarization component. Instead of the twin PDs 5I and 5Q, single PDs that only respective receive signal light may be employed.

Transimpedence amplifiers (TIAs) 6I and 6Q convert the current signals from the twin PDs 5I and 5Q into voltage signals, respectively. Furthermore, auto-gain control amplifiers (AGCs, amplification section) 7I and 7Q amplify the voltage signals from the TIAs 6I and 6Q, respectively.

Analog-digital converters (ADCs) 8I and 8Q convert the electric signals from the AGCs 7I and 7Q into multi-bit digital signals, and direct them to DSPs 9A. Examples of multi-bit signals include digital signals of multiple bits or one byte.

A digital signal processor (DSP) 9A includes signal processing sections 9I and 9Q and data recovery section 9a. The signal processing sections 9I and 9Q carry out signal processing on the digital signals from the ADCs 8I and 8Q, respectively, using a finite impulse response (FIR) filter or the like to compensate for waveform distortions. The FIR filter may be replaced with an IIR filter to give the similar effects. An FIR filter, an IIR filter, or other filters may be correctively referred to as a "filter." The DSP is a processor, and the processor may be constructed by logic circuits, or may be constructed by FPGAs or the like, dependent on the transmission rate of multi-level phase modulation signals and processing speed of the signal processing. In other words, processors may include logic circuits, FPGAs, or the like. Note that waveform distortions to be compensated for include distortions caused by chromatic dispersions, polarization mode dispersions, self phase modulations (SPMs) or the like in an optical transmission path, for example.

The data recovery section 9a recovers data using a result in which waveform distortions are compensated for at the respective signal processing sections 9I and 9Q. The data may be recovered using the technique described in the above-identified Non-Patent Reference 1, for example.

With the configuration as described above, the coherent receiver 1 depicted in FIG. 1 recovers data by demodulating optical signals that are independently multi-level phase modulated (for example, QPSK modulation) in two polarization directions that are orthogonal with each other at the corresponding signal demodulation processing systems 2X and 2Y.

This processing may encounter a propagation delay time that is caused in accordance with temperatures at components 5I, 5Q, 6I, 6Q, 7I, and 7Q from the output from the 90-degree hybrid circuit 4 of each of the signal demodulation processing systems 2X and 2Y to the ADCs 8I and 8Q, a propagation delay time in accordance with the temperatures at connections between components. A delay time difference may be caused between the in-phase signal and the quadrature signal in each system 2X, 2Y due to temperature change or aging. In addition, delay time difference similar to those described above may be caused by the difference in gain setting values in the AGCs 7I and 7Q.

Thus, even when the signals are output from the 90-degree hybrid circuit 4 to the twin PDs 5I and 5Q in a timely manner, the quality of recovered data at the data recovery section 9a may be affected if there is a delay difference in the signals when they reach at the ADCs 8I and 8Q.

Figure 2:
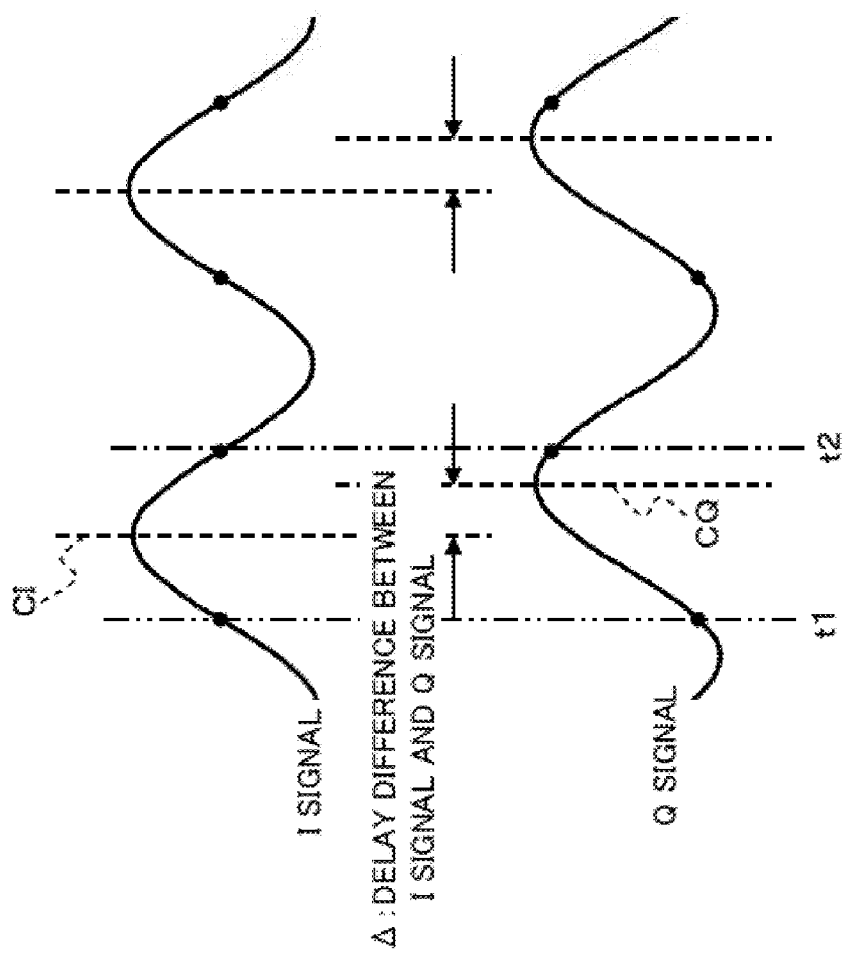
FIG. 2 is a diagram illustrating the delay difference between the in-phase signal and the quadrature signal when they reach at an ADC.

FIG. 2 is a diagram illustrating the delay difference described above. The voltage signals input into the ADCs 8I and 8Q have information in a unit of symbol. The ADCs 8I and 8Q convert the input signals into digital signal at two sampling timing (at t1 and t2 depicted in FIG. 2, for example) within one symbol such that the DSP 9A captures the level of the voltage signals in a unit of symbol.

As depicted in FIG. 2, for example, when a delay difference Δ occurs in an I signal and a Q signal that are input into the ADCs 8I and 8Q, respectively, the sampling timing at the ADCs 8I and 8Q is translated into an offset in the symbols. The ADC 8I depicted in FIG. 2 samples at timings that are shifted at the same distance in both directions with respect to the time CI that is the center of a symbol duration within a unit symbol duration. In contrast, at the ADC 8Q, sampling timings at two points within a unit symbol duration are shifted at the different distances with respect to the center of a symbol duration CQ. Such an offset in sampling timings within a unit symbol duration results in fluctuations in sampling data, which directly affects the signal quality input into the DSP 9A.

First Embodiment

Figure 3:
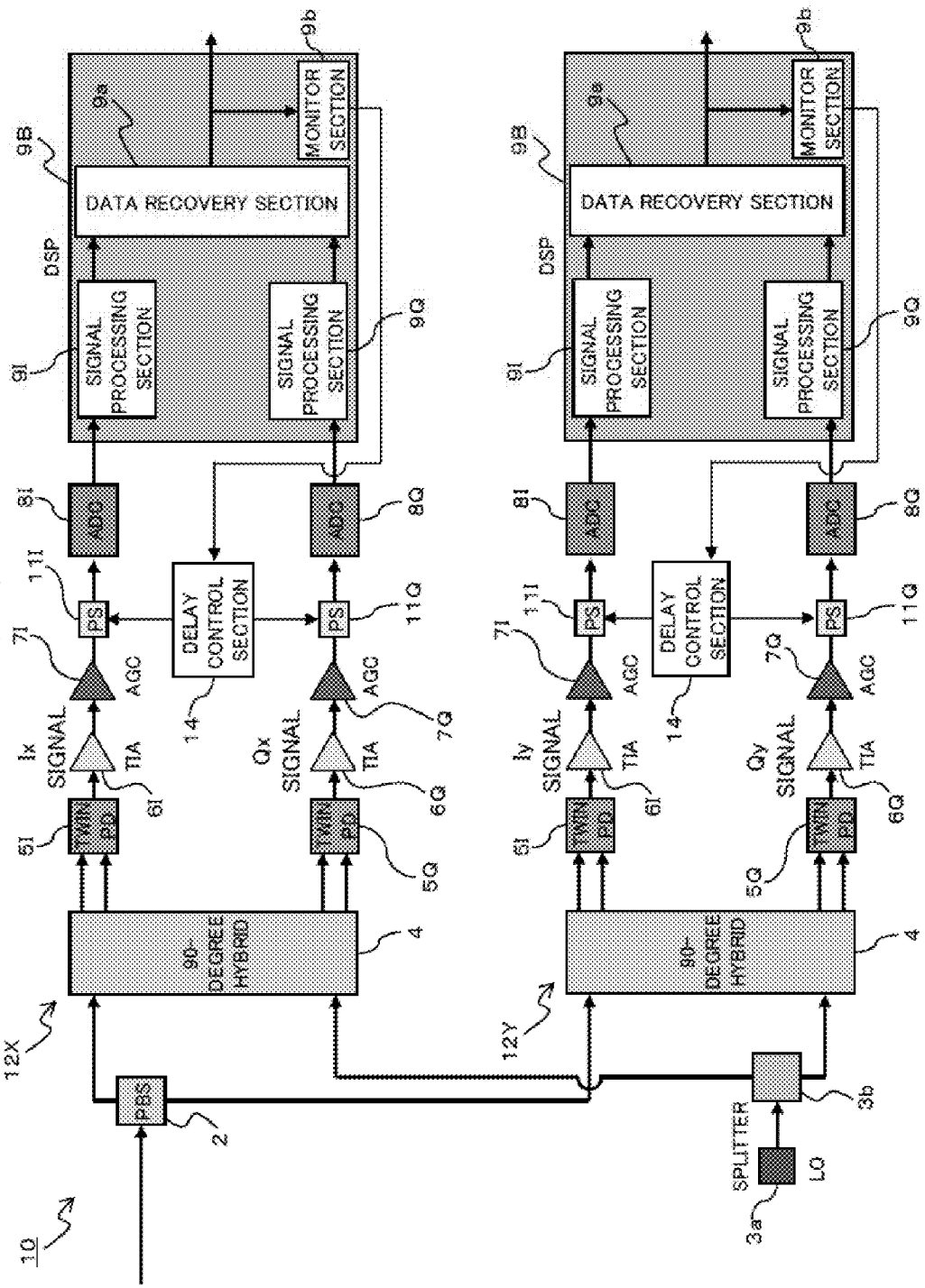
FIG. 3 is a diagram illustrating a first embodiment.

Thus, for example, the delay difference in an electric signal that is input into the ADCs 8I and 8Q is reduced as depicted in FIG. 3. In a coherent receiver (receiving apparatus) 10 depicted in FIG. 3, each of signal demodulation processing systems 12X and 12Y having components 4-8, and 9B referenced to by the common reference symbols, further includes phase shifters (PSs) 11 and a delay control section 14.

That is, the system may exemplify a receiver unit that receives (inputs) multi-level phase modulated light, and output an in-phase signal and a quadrature signal by the 90-degree hybrid circuit 4 and twin PDs 5. In this case, the in-phase signal and the quadrature signal are output as analog electric signals. The twin PD 5 is one example of an opto-electric conversion section that converts an in-phase signal and a quadrature signal of optical signals originating from multi-level phase modulated light to respective analog electric signals through opto-electric conversion processing. In addition, the TIA 6 and the AGC 7 are one example of an amplification section that carries out amplification processing on an in-phase signal and a quadrature signal of an analog electric signal originating from multi-level phase modulated light. Furthermore, the ADC 8 is one example of an analog-digital conversion section that converts the in-phase signal and the quadrature signal in the analog electric signals into respective digital electric signals through analog-digital conversion processing.

In addition, the phase-shifters 11I and 11Q are one example of a delay device that provides a delay amount to both of the in-phase signal and the quadrature signal originating from the multi-level phase modulated light. That is, the phase-shifters 11I and 11Q provide a variable time delay for at least one (both, in this case) of the in-phase signal and the quadrature signal at the stage subsequent to the amplification processing at the AGCs 7I and 7Q, respectively.

That is, at the phase-shifters 11I and 11Q, the electric signals input into the ADCs 8I and 8Q as electric signals are given a delay amount by means of a phase shift, thereby reducing a relative delay difference. Note that the electric signals input into the phase-shifters 11I and 11Q are signals originated from multi-level phase modulated light, such as the (D)QPSK, and the signal input into the phase-shifter 11I is an in-phase signal and the signal input into the phase-shifter 11Q is a quadrature signal.

Figure 4:
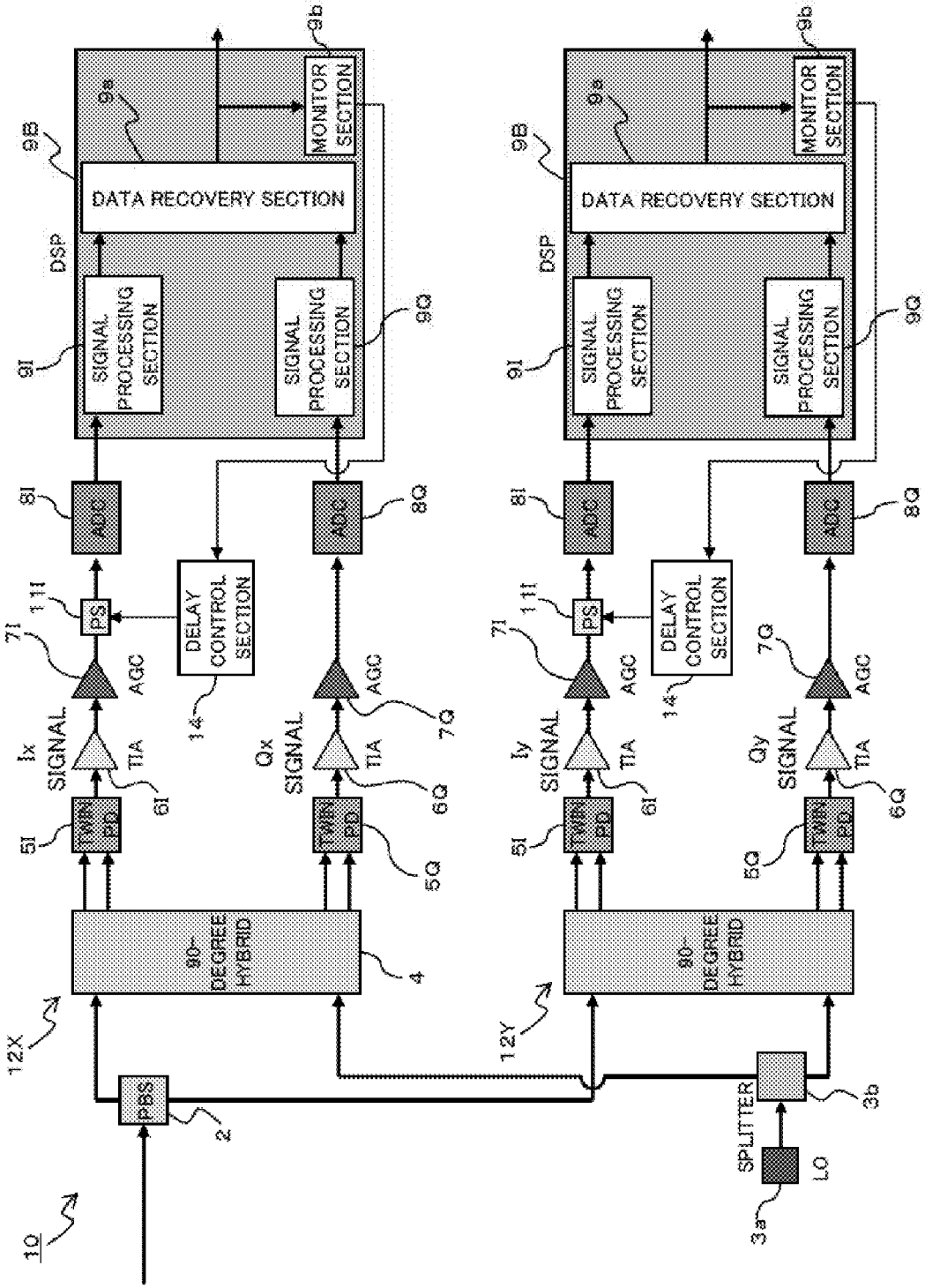
FIG. 4 is a diagram illustrating a variant of the first embodiment.

Additionally, although the example depicted in FIG. 3 has the phase-shifters 11I and 11Q that provide delay amounts by means of a phase shift for both of the in-phase signal and the quadrature signal, only the phase-shifter 11I may be provided that gives a delay amount for one of the quadrature signal and the in-phase signal (in-phase signal, for example), as depicted in FIG. 4, for example. Constructing in this manner can also reduce delay differences that occur in electric signals that are input into the ADCs 8I and 8Q.

Furthermore, the delay control section 14 depicted in FIG. 3 is adapted to control delay amounts by means of a phase shift, based on the result of the signal processing carried out at the DSP 9B, at the phase-shifters 11I and 11Q (the phase-shifter 11I in the case of FIG. 4), and is one example of delay control section. That is, the delay control section 14 controls delay amounts at the phase-shifters 11I and 11Q based on the result of conversion into digital signals and signal processing on the in-phase (I) signal and the quadrature (Q) signal including signals which are provided with delay at the phase-shifters 11I and 11Q. Although the result of the signal processing carried out at the DSP 9B in this example is a monitored value of the quality of the signal when data recovery is carried out, other values, for example, values indicative of the quality of the signal may be employed, for example (for example, a DSP 9C in FIG. 14 which will be described later).

The DSP 9B is one example of a signal processing section that carries out digital signal processing digital on outputs from the ADCs 8I and 8Q. That is, the DSP 9B carries out data recovery for the in-phase signal (I signal) and the quadrature signal (Q signal) including signals which are provided with delay at the phase-shifters 11I and 11Q which are converted into digital signals and are subjected to signal processing.

The DSP 9B includes signal processing sections 9I and 9Q, a data recovery section 9a, and a monitor section 9b, for instance. The signal processing sections 9I and 9Q are one example of a distortion compensation processing section that carries out processing to compensate for a waveform distortion on outputs from the ADCs 8I and 8Q in accordance with the in-phase signal and the quadrature signal, respectively, and fundamentally those similar to the signal processing sections 9I and 9Q depicted in FIG. 1 described above may be applied.

In addition, the data recovery section 9a is one example of data recovery section that carries out data recovery based on outputs from the signal processing sections 9I and 9Q. Furthermore, the monitor section 9b is one example of a monitor section that monitors an indicative value of an offset of an input timing of the in-phase signal into the ADC 8I and the quadrature signal into the ADC 8Q from the data recovery section 9a, as one mode of signal processing. The indicative value monitored at the monitor section 9b may be a value indicating the quality of the recovered data as a result of processing at the data recovery section 9a, and the bit error rate (BER), the Q value, the error count value, and the like of data may be used, for example.

Thereby, the delay control section 14 controls respective phase shift values (delay amounts) for the phase-shifters 11I and 11Q based on the above-described indicative values monitored at the respective monitor sections 9b in the DSPs 9B. For example, the hill-climbing method or the like for searching for a phase shift value having an optimal indicative value may be employed in which the phase shift value is further shifted to the side having a better indicative value from the monitor section 9b when the phase shift value is varied at a certain width. Thereby, phase shift values that give optimum indicative values can be provided at the phase-shifters 11I and 11Q.

In this case, for example, when the BER or the error count value is used as an indicative value, for instance, the optimum value of the indicative value may be set to the minimum value. Alternatively, when the Q value is used as the indicative value, for instance, the optimum value of the indicative value may be set to the maximum value.

The control in the delay control section 14 optimizes delay difference between the in-phase signal input into the ADC 8I and the quadrature signal input into the ADC 8Q, which can optimize the quality of recovered data and minimize deterioration of the receiving performance.

Note that the 90-degree hybrid circuit 4, the twin PDs 5I and 5Q, the TIAs 6I and 6Q, and the AGCs 7I and 7Q in each of the signal demodulation processing systems 12X and 12Y may be integrated into a receiver front-end module, for example. The receiver front-end module in this case is one example of front-end section that receives a multi-level phase modulated optical signal and outputs an in-phase signal and a quadrature signal of analog electric signals. Furthermore, the PBS 2, the local oscillator 3a, and the splitter 3b may be integrated into the front-end module where appropriate, and in such a case, the above-described components of the two signal demodulation processing systems contributing to polarization division multiplexing may be integrated.

An example of the operation of the coherent receiver 10 as described previously will be explained.

When an optical signal that is multi-level phase modulated into polarization components in two directions that are orthogonal with each other is input, the signal is divided into corresponding polarization components by the PBS 2, which are directed to the two signal demodulation processing systems 12X and 12Y.

Each of the signal demodulation processing systems 12X and 12Y converts the multi-level phase modulated optical signal into electric signals of an in-phase signal (I signal) and a quadrature signal (Q signal), and carries out data recovery through digital signal processing at the DSP 9B.

At this time, the delay control section 14 controls phase shift values at the phase-shifters 11I and 11Q based on indicative values monitored by the monitor section 9b. Thereby, it is possible to optimize the input timings of the in-phase signal input into the ADC 8I and the quadrature signal input into the ADC 8Q.

Note that the phase-shifters 11I and 11Q and phase control section 14 may be integrated in the coherent receiver 10 in the first embodiment. In such integrated phase-shifters 11I and 11Q in this case, at least one of the in-phase signal and the quadrature signal originated from the multi-level phase modulated light may be constructed as a component of a delay processing apparatus for providing a variable time delay.

Other modularization in various modes may be considered.

For example, the phase-shifters 11I and 11Q and the delay control section 14 may be modularized in one of two signal demodulation processing systems 12X and 12Y as in the modes illustrated in FIGS. 5-9. Note that "I" and "Q" that are appended to each reference numeral (4-8 and 11) are omitted when the elements indicated by the reference numeral are correctively referenced to.

Figure 5:
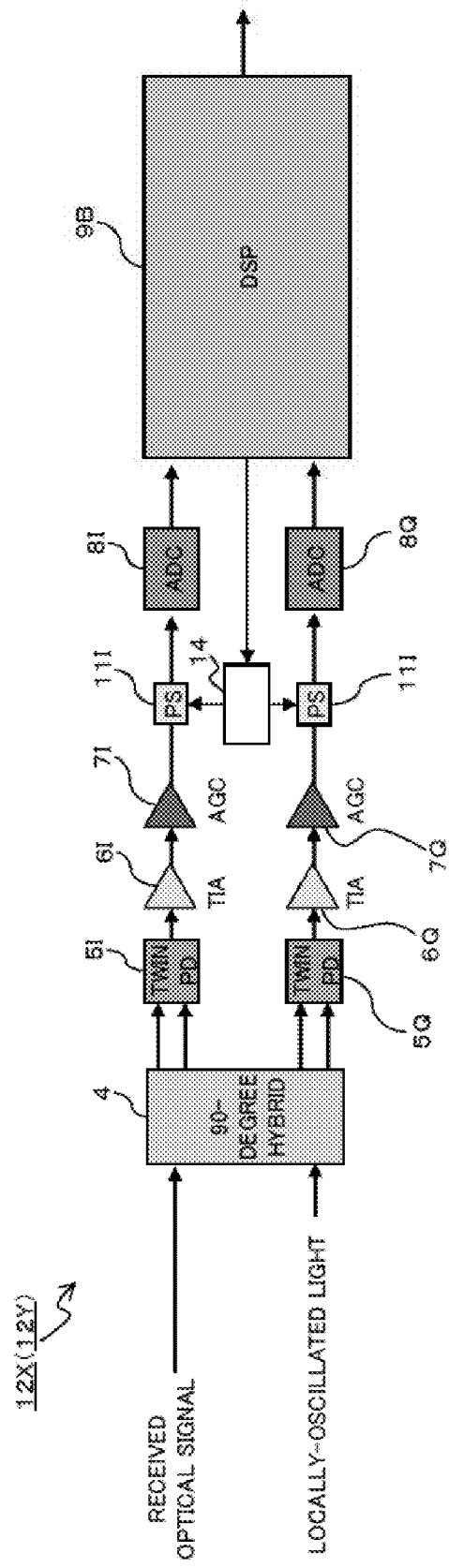
FIG. 5 is a diagram illustrating an exemplary aspect of a modularization of the apparatus in the first embodiment apparatus.

In the mode illustrated in FIG. 5, each of the components 4-8, 11, 13, and 14 exemplified in FIG. 3 are modularized as discrete components.

Figure 6:
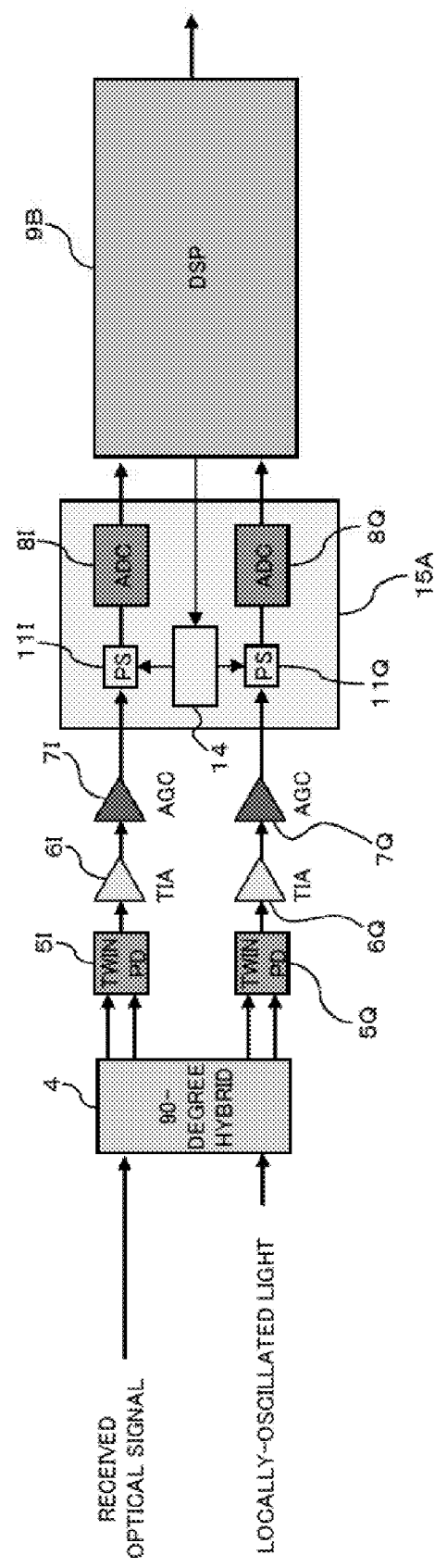
FIG. 6 is a diagram illustrating an exemplary aspect of a modularization of the apparatus in the first embodiment apparatus.

In addition, in the mode exemplified in FIG. 6, a module 15A that integrates the phase-shifter 11, the ADC 8, and the delay control section 14 is provided. The module 15A in this case is an analog-digital conversion apparatus that converts an in-phase signal (in-phase analog signal) and a quadrature signal (orthogonal analog signal) of analog electric signals originated from multi-level phase modulated light into respective digital electric signals through analog-digital conversion processing.

Figure 7:
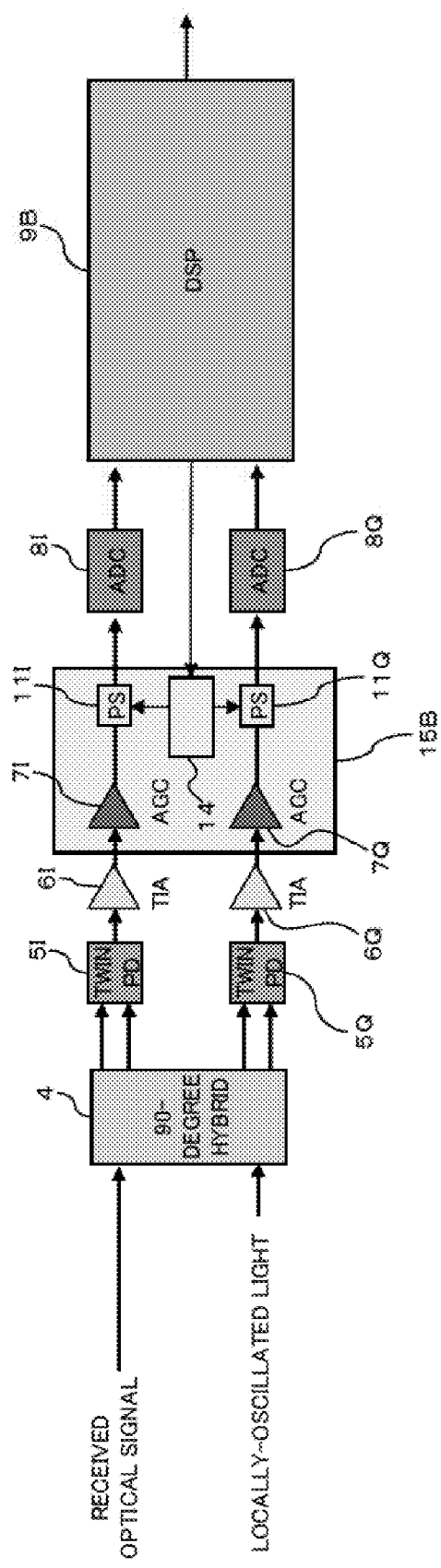
FIG. 7 is a diagram illustrating an exemplary aspect of a modularization of the apparatus in the first embodiment apparatus.

Furthermore, in the mode exemplified in FIG. 7, a module 15B that integrates the phase-shifter 11 and the delay control section 14 is provided. The module 15B in this case is a signal amplification apparatus that carries out amplification processing on an in-phase signal and a quadrature signal of analog electric signals originated from multi-level phase modulated light.

Figure 8:
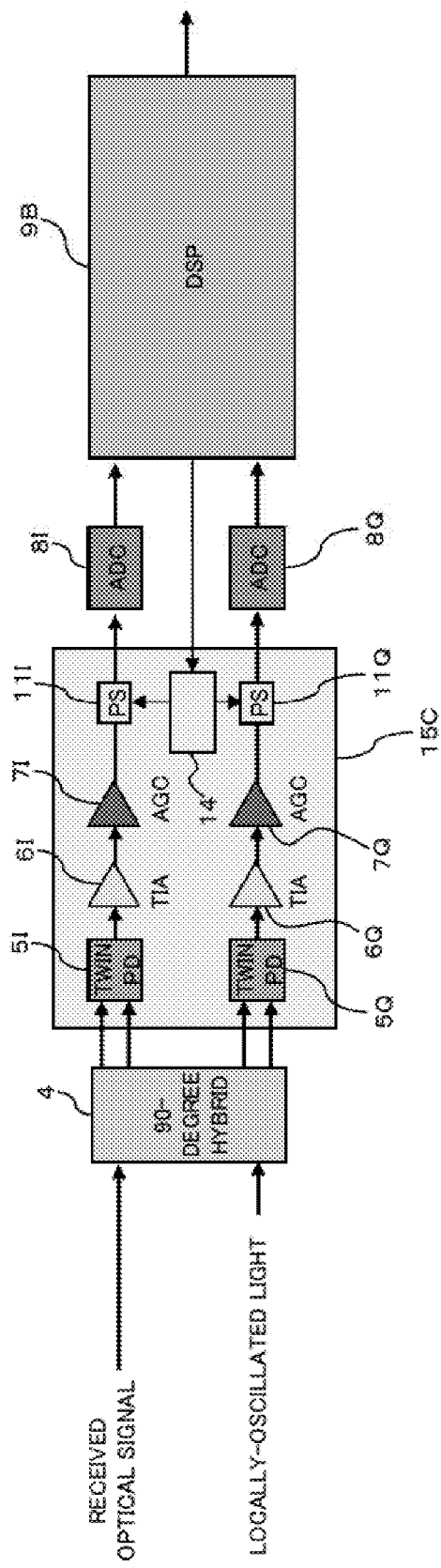
FIG. 8 is a diagram illustrating an exemplary aspect of a modularization of the apparatus in the first embodiment apparatus.

In addition, in the mode exemplified in FIG. 8, a module 15C that integrates the twin PDs 5, the TIAs 6, the AGCs 7, the phase-shifter 11, and the delay control sections 14. The module 15C of this case is an opto-electric conversion device that converts an in-phase signal and an orthogonal signal of optical signals originating from multi-level phase modulated light to respective analog electric signals through opto-electric conversion processing.

Figure 9:
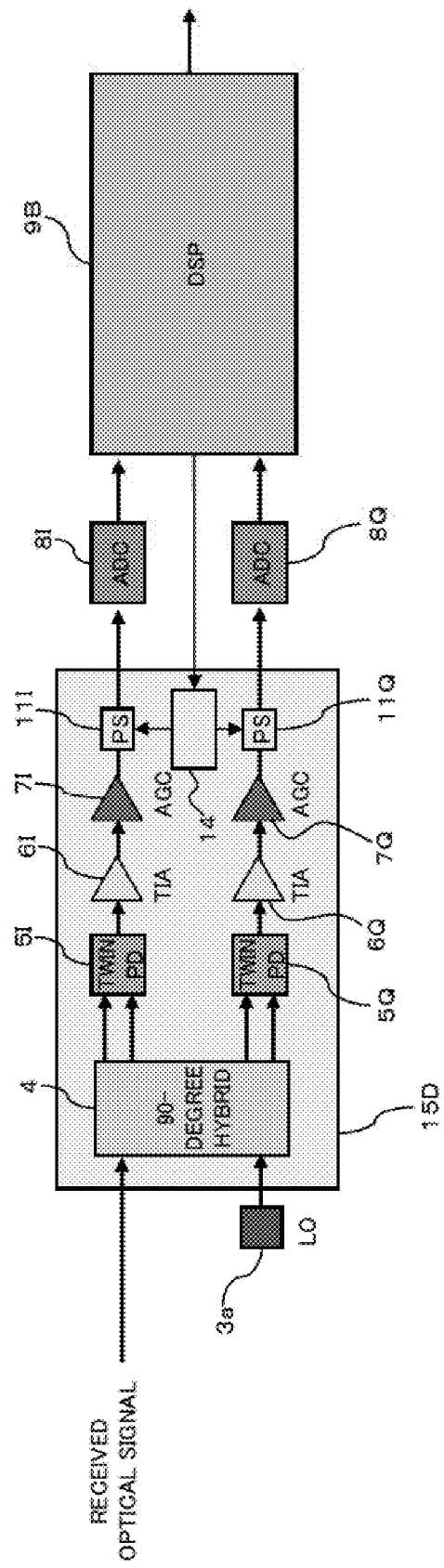
FIG. 9 is a diagram illustrating an exemplary aspect of a modularization of the apparatus in the first embodiment apparatus.

Furthermore, in the mode exemplified in FIG. 9, the phase-shifter 11 and the delay control section 14 are integrated into the receiver front-end module 15D that is provided for each of the signal demodulation processing systems 12X and 12Y. The receiver front-end module (front-end section, receiving apparatus) 15D illustrated in FIG. 9 is adapted to receive one of two linearly polarized components polarization separated at the PBS 2 as a received optical signal, and mixes the signal with locally-oscillated light from the local oscillator 3a that is provided externally at the 90-degree hybrid circuit 4.

Additionally, a receiver front-end module that integrates the 90-degree hybrid circuits 4, the twin PDs 5, the TIAs 6, the AGCs 7, the phase-shifters 11, and the delay control sections 14 that are components of two signal demodulation processing systems 12X and 12Y, together with the PBS 2, the local oscillator 3a, and the splitter 3b, may be employed, for example.

As described above, according to the first embodiment, the signal quality of data recovered may be advantageously improved at the receiving end of the multi-level phase modulation communication system.

Second Embodiment

Figure 10:
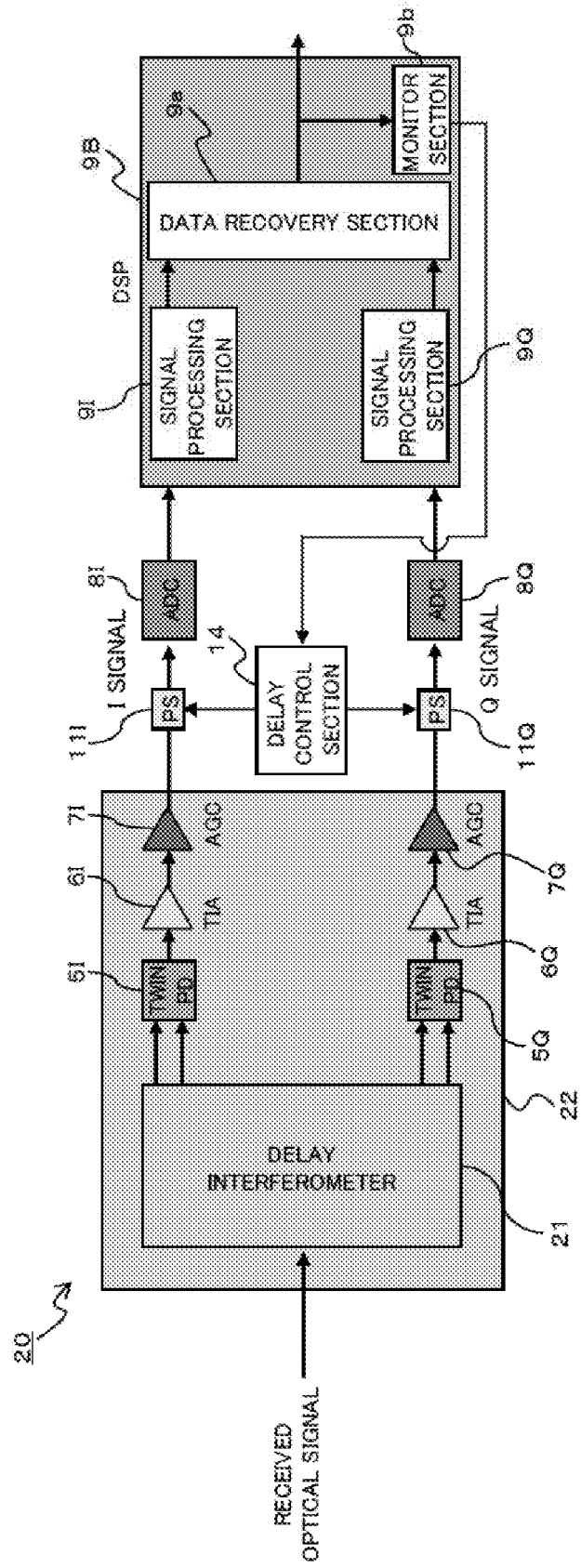
FIG. 10 is diagram illustrating a second embodiment.

FIG. 10 is diagram illustrating a second embodiment. An optical receiver 20 illustrated in FIG. 10 may be applicable as a signal demodulation processing system for one linearly polarized component of a polarization multiplexed optical signal as in the case of the first embodiment. In addition, the optical receiver 20 may be also applicable as a receiver that receives multi-level phase modulated optical signal that is not polarization division multiplexed (for example, DQPSK optical signal).

The optical receiver 20 depicted in FIG. 10, different from the above-described first embodiment, converts a multi-level phase modulated optical signal into an intensity modulation signal in the direct receiving scheme. That is, different from the case of the first embodiment, a local oscillator and a 90-degree hybrid are not provided; instead, a delay interferometer 21 is included. Note that like reference numerals depicted in FIG. 10 denote similar elements depicted in FIG. 3.

Here, the delay interferometer 21 receives a multi-level phase modulated optical signal and outputs an in-phase signal (I signal) and a quadrature signal (Q signal) through delay interference processing. These in-phase signal and quadrature signal can be regarded as a multi-level phase modulated optical signal converted into an intensity modulated optical signal, which are two outputs of signal light and phase conjugate light.

Similar to the case of the first embodiment, the in-phase signal and the quadrature signal output from the delay interferometer 21 is received by the twin PDs 5I and 5Q, output from voltage signals from the TIAs 6I and 6Q, and amplified by the AGCs 7I and 7Q, respectively. The phase-shifters 11I and 11Q, which are under control of the delay control section 14, carries out phase shift on the in-phase signal and the quadrature signal from the AGCs 7I and 7Q, and directs them to the ADCs 8I and 8Q, respectively. Thereby, similar to the case of the above-described first embodiment, the delay difference between the in-phase signal input into the ADC 8I and the quadrature signal input into the ADC 8Q are optimized, and the quality of recovered data can be optimized.

Note that, the delay interferometer 21, the twin PDs 5I and 5Q, the TIAs 6I and 6Q, and the AGCs 7I and 7Q may be integrated into a receiver front-end 22, as illustrated in FIG. 10.

In addition, the phase-shifters 11I and 11Q and phase control section 14 may be modularized as in the modes exemplified in FIGS. 5-9.

Third Embodiment

Figure 11:
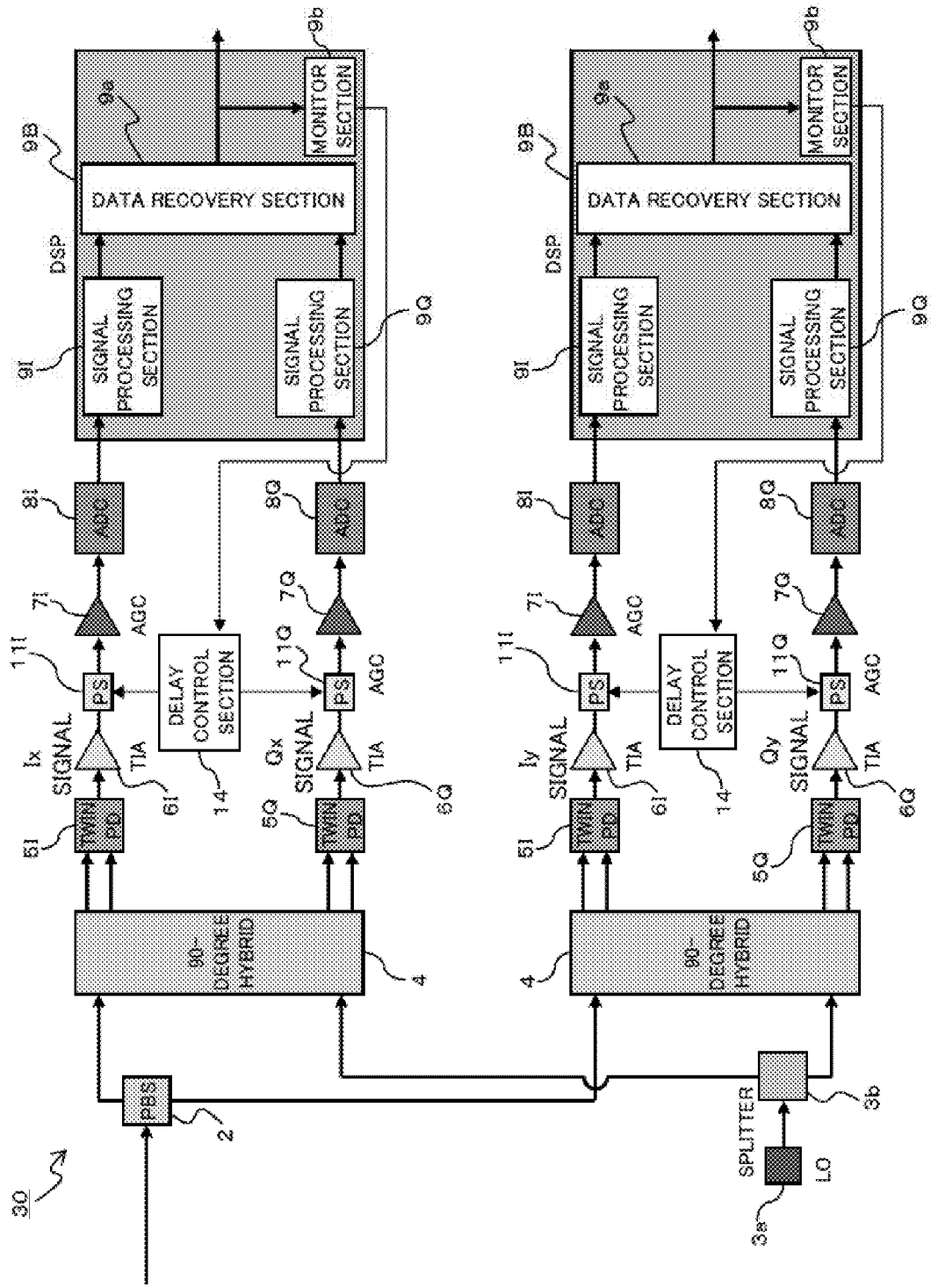
FIG. 11 is diagram illustrating a third embodiment.

FIG. 11 is diagram illustrating a third embodiment. A coherent receiver 30 illustrated in FIG. 11 receives an optical signal similar to that in the first embodiment, but the locations of the phase-shifters 11I and 11Q are different from those in the first embodiment. Note that like reference numerals depicted in FIG. 11 denote substantially similar elements depicted in FIG. 3. That is, the coherent receiver 30 illustrated in FIG. 11, the phase-shifter 11I is inserted between the TIA 6I and the AGC 7I, and the phase-shifter 11Q is inserted between the TIA 6Q and the AGC 7Q.

That is, the phase-shifters 11I and 11Q that are one example of a delay device provide a variable time delay for at least one (both, in this case) of the in-phase signal and the orthogonal signal at the previous stage of amplification processing at the AGCs 7I and 7Q, respectively.

The advantages same as in the case of the first embodiment can also be obtained through this configuration.

Note that the phase-shifters 11I and 11Q and phase control section 14 may be integrated, or alternatively, modularized in a various manners as in the modes exemplified in FIGS. 5-9.

Fourth Embodiment

Figure 12:
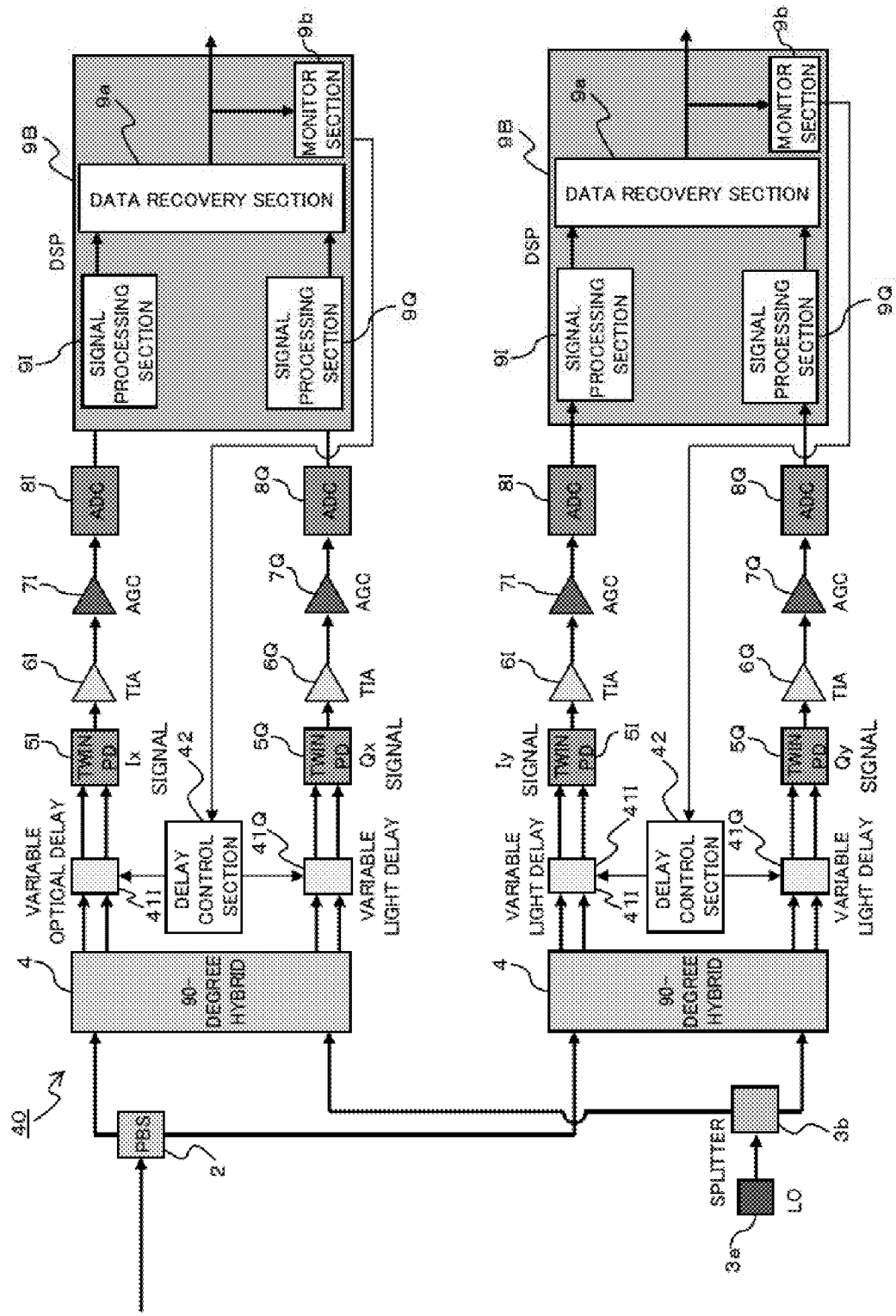
FIG. 12 is a diagram illustrating a fourth embodiment.

FIG. 12 is diagram illustrating a fourth embodiment. A coherent receiver 40 illustrated in FIG. 12 receives an optical signal similar to that in the case of the first embodiment. This embodiment is different from the case of the first embodiment in that a variable optical delay device 41I is inserted between the 90-degree hybrid circuit 4 and the twin PDs 5I, and a variable optical delay device 41Q is inserted between the 90-degree hybrid circuit 4 and the twin PDs 5Q, instead of the phase-shifters 11I and 11Q (see FIG. 3), and that a delay control section 42 is provided which controls respective delay amounts at the variable optical delay devices 41I and 41Q. Note that like reference numerals depicted in FIG. 3 denote substantially similar elements.

Variable optical delay device using a spatial optical system or a planer lightwave circuit (PLC) may be employed as the variable optical delay devices 41I and 41Q. The variable optical delay devices 41I and 41Q may be integrated together with the 90-degree hybrid circuit 4.

At the delay control section 42, an optical delay amount to each of the variable optical delay devices 41I and 41Q may be controlled independently based on the indicative value monitored by the monitor section 9b similar to the case of the first embodiment. For example, the delay amount is further shifted to the side having a better indicative value from the monitor section 9b when the delay amount is varied at a certain width, and the hill-climbing method or the like which searches for an optical delay amount having an optimal indicative value is employed. Thereby, optical delay amounts at the variable optical delay devices 41I and 41Q that can appropriately set the indicative value may be provided.

The advantages same as in the case of the first embodiment can also be obtained through this configuration.

Note that the variable optical delay devices 41I and 41Q may be constructed as an optical front-end apparatus or an opto-electric conversion apparatus in which the components are integrated in the manner similar to the above-described FIG. 9. Alternatively, the 90-degree hybrid circuit 4, the VOAs 41I and 41Q, the twin PDs 5I and 5Q, and the delay control section 42 may be constructed as an opto-electric conversion apparatus that is at least partially integrated.

Fifth Embodiment

Figure 13:
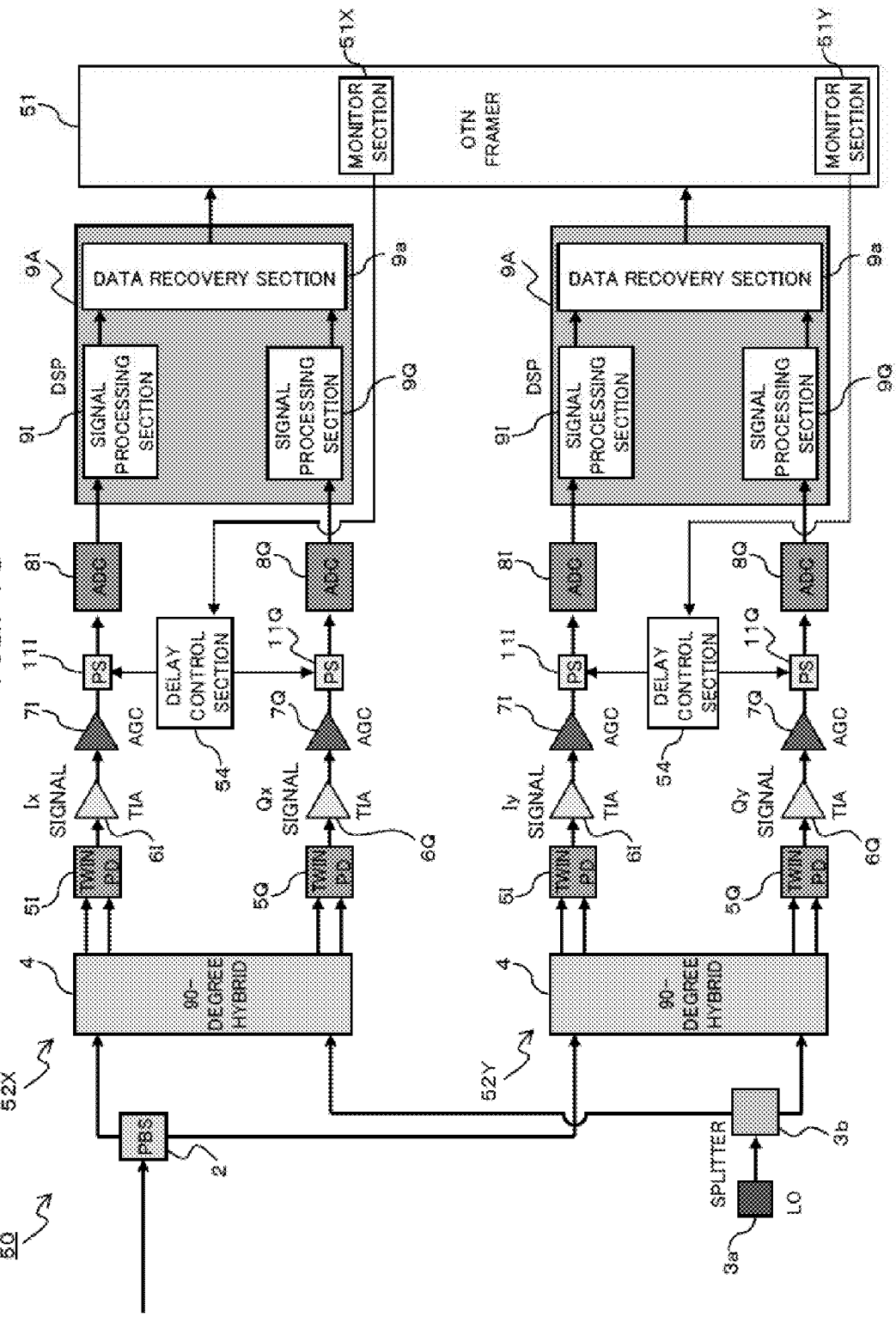
FIG. 13 is a diagram illustrating a fifth embodiment.

FIG. 13 is diagram illustrating a fifth embodiment. A coherent receiver 50 illustrated in FIG. 13 receives an optical signal similar to that in the case of the first embodiment. In addition, the coherent receiver 50 includes signal demodulation processing systems 52X and 52Y having components 4-8 and 11 similar to those in the case of the first embodiment, together with the PBS 2, the local oscillator 3a, and the splitter 3b. That is, the phase-shifter 11I is inserted between the AGC 7I and the ADC 8I, and the phase-shifter 11Q is inserted between the AGC 7Q and the ADC 8Q.

However, the signal demodulation processing systems 52X and 52Y respectively include a delay control section 54 and a DSP 9A that are different from those in the first embodiment.

The delay control section 54 controls phase shift values at the phase-shifters 11I and 11Q based on the monitor results from monitor sections 51X and 51Y that monitor values that are to be indicative values of the signal quality at an optical transport Network (OTN) framer 51. Thereby, different from the case of the first embodiment, a DSP 9A (see FIG. 1) that omits a function as the monitor section 9b may be applicable.

The OTN framer 51 carries out termination processing on an OTN frame that is a multiplexing frame using data recovered from an optical signal receive at the coherent receiver 50. The monitor sections 51X and 51Y monitor signal quality of respective recovered data as above-described indicative values in the termination processing of an OTN frame using recovered data from the signal demodulation processing systems 52X and 52Y, respectively.

Thereby, focusing on the signal demodulation processing system 52X, for example, at the delay control section 54 in the signal demodulation processing system 52X, phase shift values of the phase-shifters 11I and 11Q can be controlled such that an expected signal quality is obtained based on the monitor result from the monitor section 51X. The same is applied to the delay control section 54 in the signal demodulation processing system 52Y.

The advantages same as in the case of the first embodiment can also be obtained through this configuration.

In addition, for the phase-shifters 11I and 11Q and the delay control section 54, various modularizations may be applied as in the modes exemplified in FIGS. 5-9.

Sixth Embodiment

Figure 14:
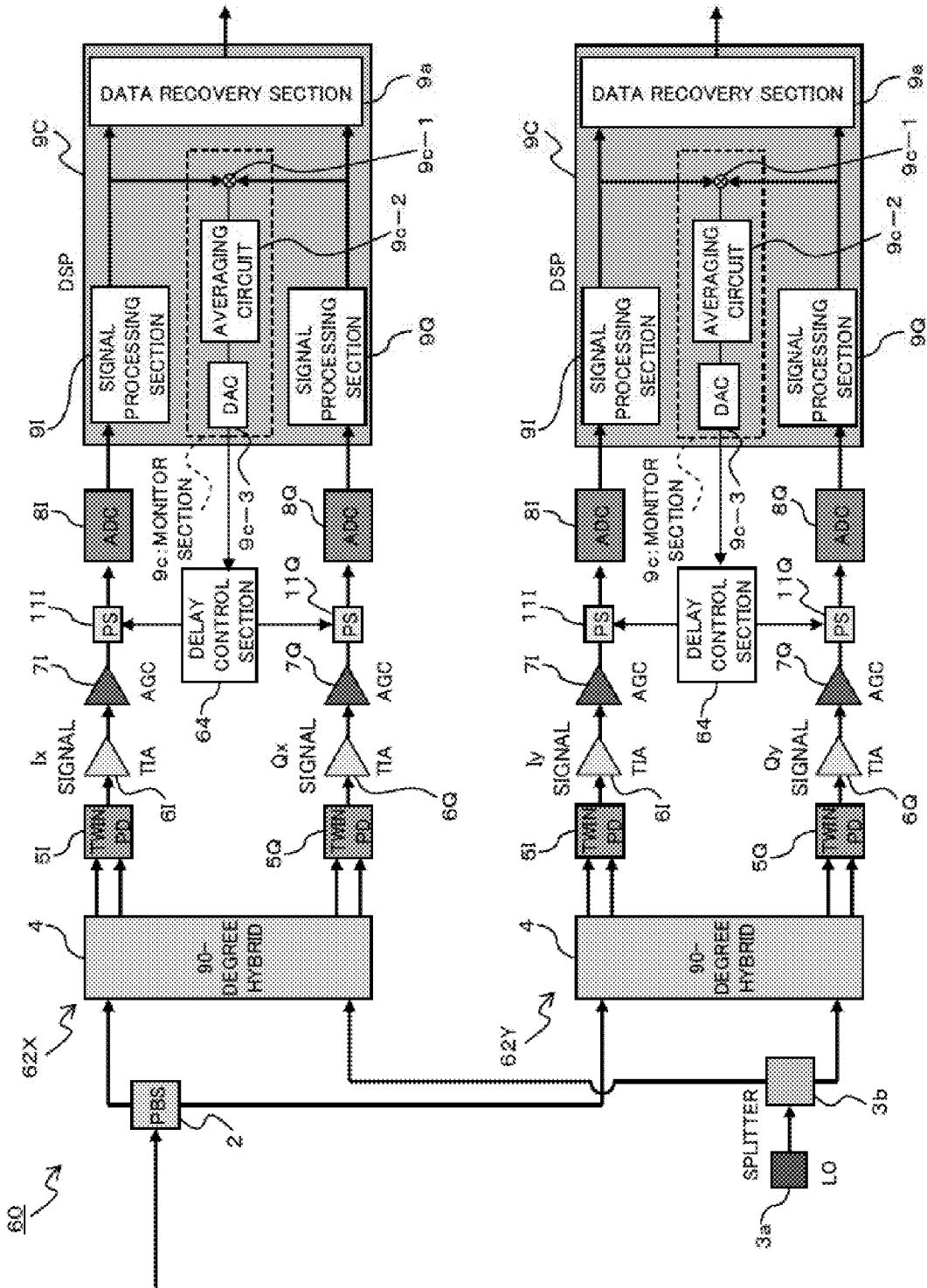
FIG. 14 is a diagram illustrating a sixth embodiment.

FIG. 14 is a diagram illustrating a sixth embodiment. A coherent receiver 60 illustrated in FIG. 14 also receives an optical signal similar to that in the case of the first embodiment. In addition, the coherent receiver 60 includes signal demodulation processing systems 62X and 62Y having components 4-8, and 11 similar to those in the case of the first embodiment, together with the PBS 2, the local oscillator 3a, and the splitter 3b. That is, the phase-shifter 11I is inserted between the AGC 7I and the ADC 8I, and the phase-shifter 11Q is inserted between the AGC 7Q and the ADC 8Q.

Here, the signal demodulation processing systems 62X and 62Y respectively include a delay control section 64 and a DSP 9C that are different from those in the first embodiment.

The DSP 9C includes the signal processing sections 9I and 9Q and the data recovery section 9a similar to the DSP 9B of the first embodiment, but further includes a monitor section 9c that is different from the monitor section 9b included in the DSP 9B in the first embodiment.

The monitor section 9c is adapted to monitor correlation between the in-phase signal and the quadrature signal after compensation of waveform distortion at the signal processing sections 9I and 9Q, respectively, and include a multiplier 9c-1, an averaging circuit 9c-2 and a digital/analog converter (DAC) 9c-3, for example.

That is, as exemplified in the Eq. (3) that will be described later, the monitor section 9c calculates multiplication of the in-phase signal and the quadrature signal output from the signal processing sections 9I and 9Q at the multiplier 9c-1, and calculates a time averaged multiplied value for the multiplication result at the multiplier 9c-1. Thereby, a correlation value as indicated by Eq. (3) is obtained. The DAC 9c-3 converts the correlation value multiplied at the multiplier 9c-1 and the averaging circuit 9c-2 described above into an analog signal, and outputs it to the delay control section 64.

The delay control section 64 receives the correlation value of the analog signal from the DAC 9c-3 in the monitor section 9c as a monitor result, and controls a phase shift value based on that correlation value at the PSs 11I and 11Q.

For example, when focusing on the signal demodulation processing system 62X, the signals IX and Qx output from the signal processing sections 9I and 9Q can be expressed as Eqs. (1) and (2), respectively, for example. Note that E and $E_{LO}$ are electric fields of the signal light and the locally-oscillated light, respectively, θ is the phase corresponding to data, ω is the frequency difference between the signal light and the locally-oscillated light, and T is the delay difference between the real number component (Ix) and the imaginary number component (Qx) in Eqs. (1) and (2).

$$I_x = |E||E_{LO}|\cos(\theta(t)+\omega t) \qquad \text{Eq. (1)}$$

$$Q_x = |E||E_{LO}|\sin(\theta(t+T)+\omega(t+T)) \qquad \text{Eq. (2)}$$

The correlation value r calculated at the correlation value accumulation section 9c-1 can be expressed as Eq. (3) using the signals IX and Qx output from the signal processing sections 9I and 9Q. Here, suppose that the probability of occurrences of the phase corresponding to data is equal to each other, the correlation value r can be regarded as having a value that varies depending on the delay difference T, as expressed in Eq. (4). This is because E, $E_{LO}$, and ω in Eq. (4) can be regarded as taking a constant value.

$$r = \sum (I_x Q_x) \qquad \text{Eq. (3)}$$
$$= \sum |E|^2 |E_{LO}|^2 \{\cos(\theta(t)+\omega t)\sin((t+T)+\omega t)\cos\omega t + \cos(\theta(t)+\omega t)\cos(\theta(t+T)+\omega t)\sin\omega t\}$$
$$= |E|^2 |E_{LO}|^2 \sin\omega T \qquad \text{Eq. (4)}$$

That is, the delay control section 64 receives the correlation value from the monitor section 9c as a representing the above-described delay difference, and controls the phase shift values of the phase-shifters 11I and 11Q such that the received correlation value r becomes 0, for example. The same is applied to the delay control section 64 in the signal demodulation processing system 62Y.

In other words, the monitor section 9c is one example of a monitor section that monitors an indicative value of an offset of the input timings (or the signal quality after data recovery) of the in-phase signal and the quadrature signal to the ADCs 8I and 8Q from the outputs from the signal processing sections 9I and 9Q. In addition, the delay control section 64 is one example of a delay control section that controls delay amounts at the phase-shifters 11I and 11Q based on the output from the monitor section 9c.

The advantages same as in the case of the first embodiment can also be obtained through this configuration.

In addition, for the phase-shifters 11I and 11Q and the delay control section 64, various modulations may be applied as in the modes exemplified in FIGS. 5-9.

Seventh Embodiment

Figure 15:
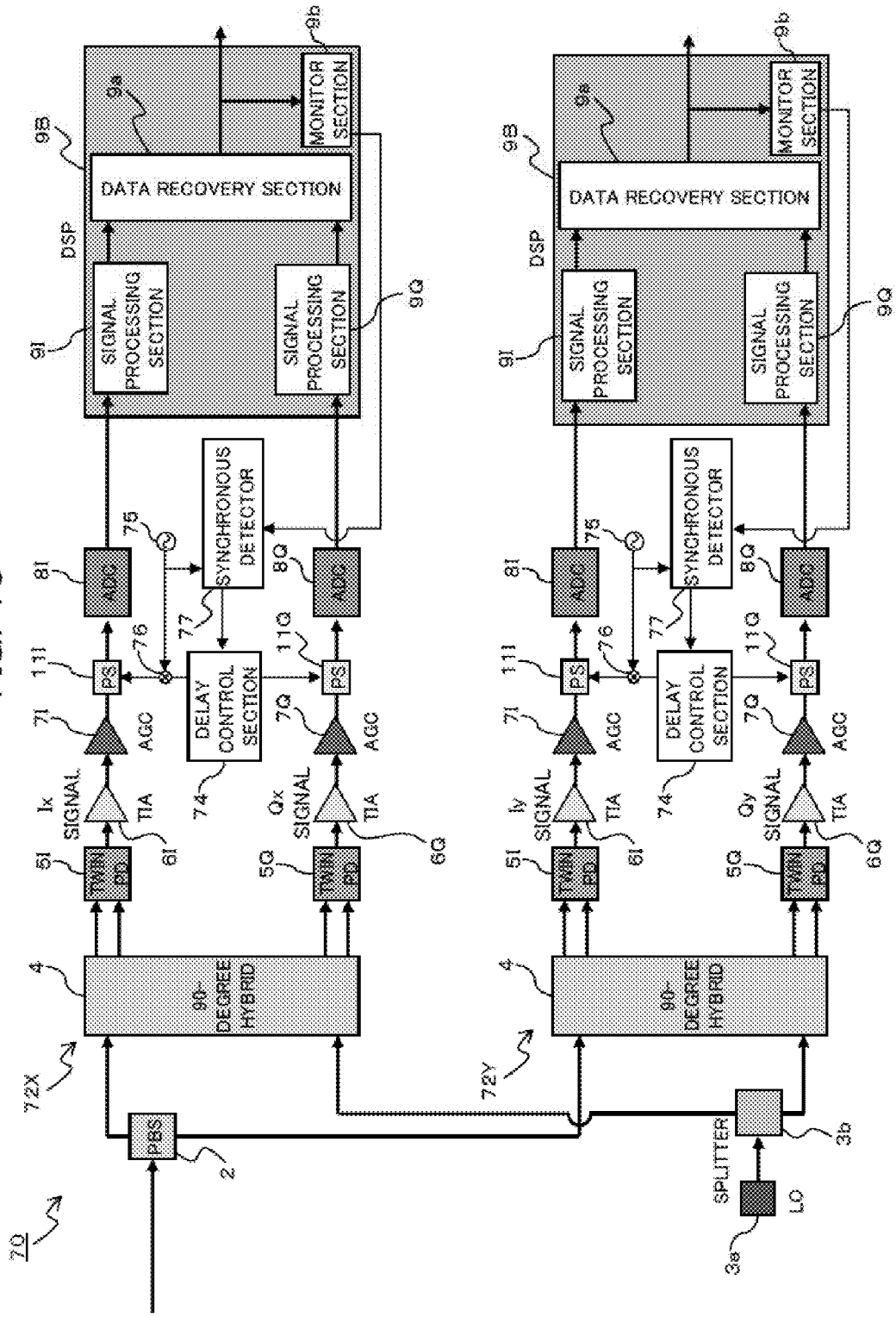
FIG. 15 is a diagram illustrating a seventh embodiment.

FIG. 15 is a diagram illustrating a seventh embodiment. A coherent receiver 70 illustrated in FIG. 15 also includes signal demodulation processing systems 72X and 72Y having the comparable components 4-9B and 11, together with the PBS 2, the local oscillator 3a, and the splitter 3b for receiving an optical signal as that in the case of the first embodiment.

Here, different from the first embodiment, the signal demodulation processing systems 72X and 72Y control delay amounts at the phase-shifters 11I and 11Q in the mode using dithering, respectively. For this purpose, each of the signal demodulation processing systems 72X and 72Y include a low-frequency signal oscillation source 75, a low-frequency superimposer 76, a synchronous detector 77, and a delay control section 74.

The low-frequency signal oscillation source 75 generates a low-frequency signal for providing a variation to the phase shift value at the phase-shifter 11I. The low-frequency superimposer 76 superimposes a low-frequency signal from the low-frequency signal oscillation source 75 on a control signal of the phase shift value from the delay control section 74 to the phase-shifter 11I. Thereby, the phase-shifter 11I provides the in-phase analog signal from the AGC 7I with a phase shift value provided with the variation.

When a variation is provided to the phase shift value as described above, the monitor section 9b outputs a value to which the variation of the phase shift value is reflected as a monitor result of the signal quality of the recovered data. The synchronous detector 77 receives a low-frequency signal from the low-frequency signal oscillation source 75 as well as a monitor result from the monitor section 9b, and extracts a low-frequency signal component from the low-frequency signal oscillation source 75 or a harmonics component thereof contained in the monitor result using the synchronous detection.

Figure 16:
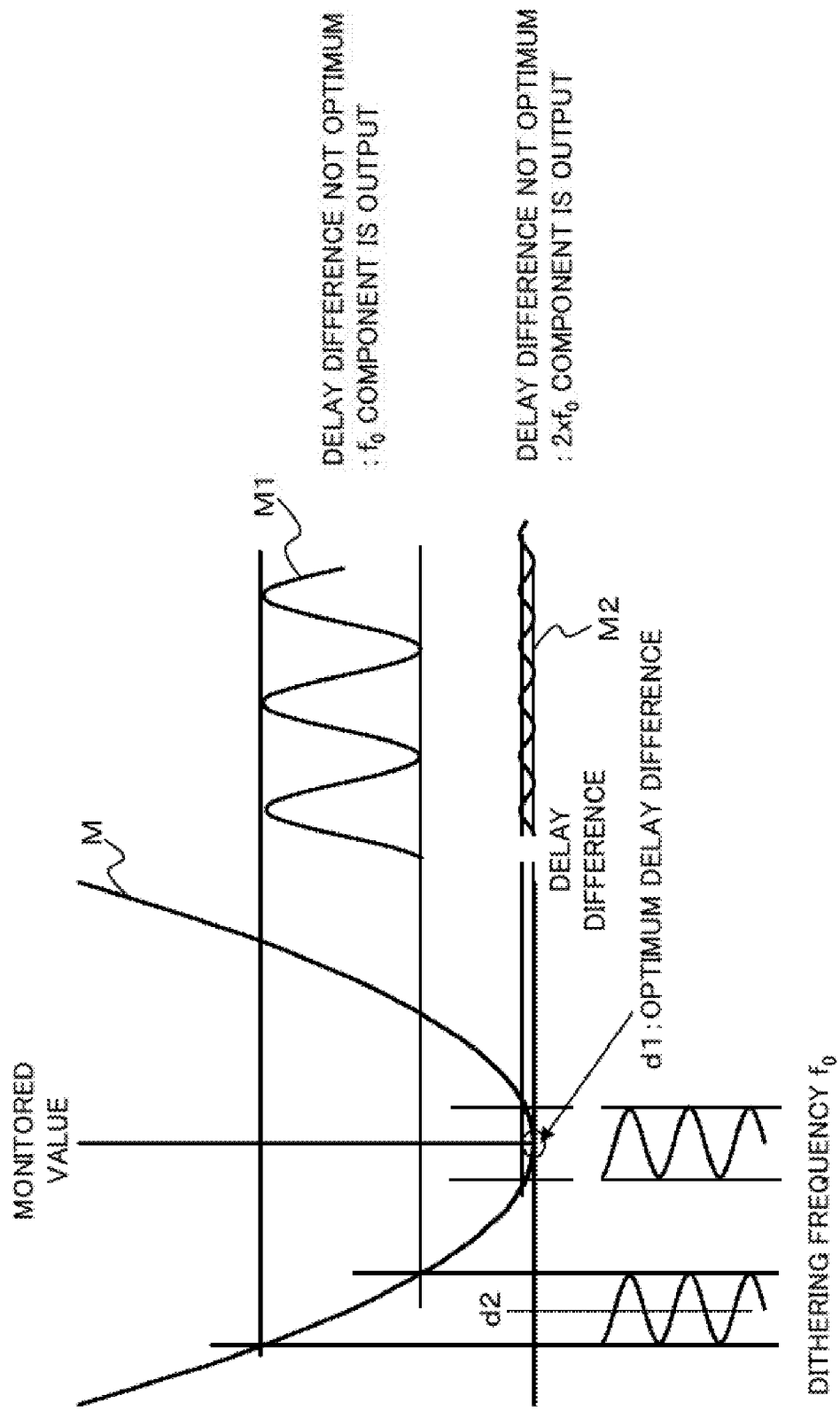
FIG. 16 is a diagram illustrating the operation of the seventh embodiment.

The delay control section 74 controls a phase shift value to the phase-shifters 11I and 11Q based on the low-frequency signal component or the harmonics component thereof extracted by the synchronous detector 77. FIG. 16 is a diagram for illustrating a control on phase shift value by the delay control section 74. For example, when monitoring the BER or the error count value at the monitor section 9b, as depicted by the curve M in FIG. 16, the monitored value is minimized when the delay difference between the in-phase signal and the quadrature signal to the ADCs 8I and 8Q is d1 while the monitored value increases as the delay difference departs from d1.

Here, the low-frequency superimposer 76 superimposes a low-frequency signal at frequency f0 from the low-frequency signal oscillation source 75 on a control signal of the phase shift value from the delay control section 74 to the phase-shifter 11I. Thereby, the delay difference between the signals input into the ADCs 8I and 8Q also fluctuates due to the phase shift at the phase-shifters 11I and 11Q. At this time, the low-frequency component contained in the monitor result from the monitor section 9b fluctuates in accordance with the delay amount on the center of the variation.

For example, when the delay difference between the signals input into the ADCs 8I and 8Q fluctuates at frequency f0 at d2 departing from d1, a component that fluctuates at a frequency of f0 is dominantly contained than the 2f0 component in the monitor result at the monitor section 9b, as indicated by the curve M1. In contrast, when the delay difference between the signals input into the ADCs 8I and 8Q fluctuates at frequency f0 on the center of d1, a component fluctuates at a frequency of 2f0 is dominantly contained than the f0 component in the monitor result at the monitor section 9b, as indicated by the curve M2.

That is, at the delay control section 74, by controlling the delay amount at the phase-shifters 11I and 11Q in the direction such that the low-frequency component f0 extracted from the monitor result from the synchronous detector 77 is minimized, it is possible to optimize the delay difference between the signals input into the ADCs 8I and 8Q. Alternatively, by controlling the delay amount at the phase-shifters 11I and 11Q in the direction such that the low-frequency component 2f0 extracted from the monitor result from the synchronous detector 77 is maximized, it is possible to optimize the delay difference between the signals input into the ADCs 8I and 8Q.

Accordingly, the advantages the same as in the case of the first embodiment described above can be obtained through this configuration.

Note that although the low-frequency signal f0 is superimposed onto the control signal given to the phase-shifter 11I in the above-described coherent receiver 70, the low-frequency signal f0 may be superimposed to the control signal given to the phase-shifter 11Q.

In addition, for the phase-shifters 11I and 11Q and the delay control section 74, various modularizations may be applied as in the modes exemplified in FIGS. 5-9.

Eighth Embodiment

Figure 17:
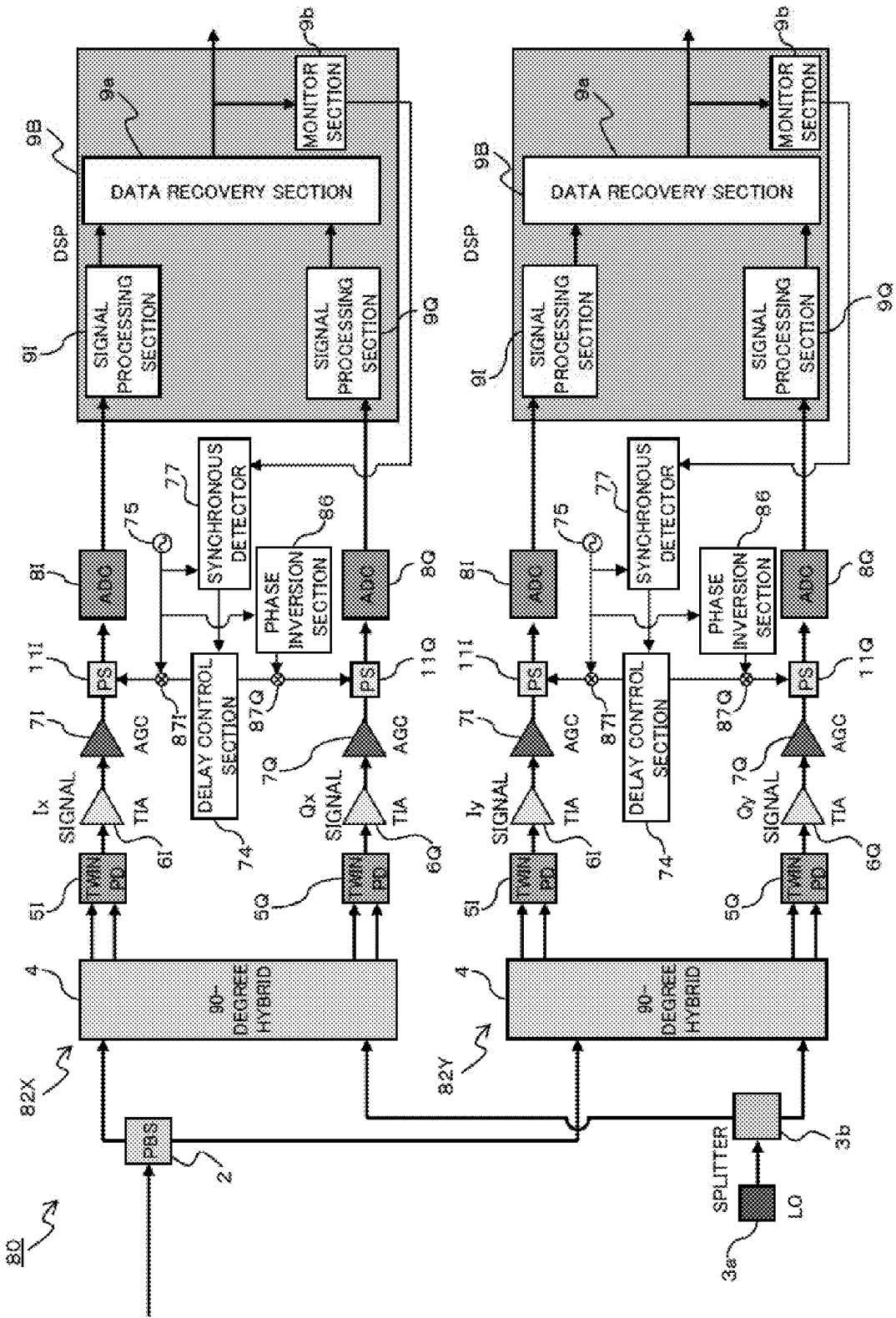
FIG. 17 is a diagram illustrating an eighth embodiment.

FIG. 17 is diagram illustrating an eighth embodiment. A coherent receiver 80 illustrated in FIG. 17 also includes signal demodulation processing systems 82X and 82Y having the components referenced to by the above reference symbols 4-9B and 11, together with the PBS 2, the local oscillator 3a, and the splitter 3b for receiving an optical signal as that in the case of the seventh embodiment.

Here, the signal demodulation processing systems 82X and 82Y are both different from those depicted in the seventh embodiment. That is, inverted low-frequency signals having the opposite phases are superimposed onto control signals to the phase-shifters 11I and 11Q. For this purpose, signal demodulation processing systems 82X and 82Y include phase inversion section 86 and the low-frequency superimposers 87I and 87Q, in addition to the delay control section 74, the low-frequency signal oscillation source 75, and the synchronous detector 77 similar to the above-described seventh embodiment.

The low-frequency superimposer 87I superimposes the low-frequency signal from the low-frequency signal oscillation source onto the control signal from the delay control section 74 to the phase-shifter 11I. The phase inversion section 86 inverts the phase of the low-frequency signal f0 generated at a low-frequency signal oscillation source 85, and outputs it to the low-frequency superimposer 87Q. Thereby, at the low-frequency superimposers 87I and 87Q, low-frequency signals having opposite phases are superimposed onto control signals that are provided to the phase-shifters 11I and 11Q for the phase shift. That is, at the phase-shifters 11I and 11Q, phase shift values that are provided with variation by low-frequency signals having inverted phases are provided for in-phase analog signals from the AGCs 7I and 7Q.

At the delay control section 74, by provision of variations to phase shift values as described previously, it is possible to optimize the delay difference between the signals input into the ADCs 8I and 8Q similar to the seventh embodiment. Accordingly, the advantages the same as in the case of the first embodiment described above can be obtained through this configuration.

Furthermore, by superimposing low-frequency signals having the opposite phases to the phase-shifters 11I and 11Q at the low-frequency superimposers 87I and 87Q, respectively, when the control is carried out, variations in the delays of the in-phase signal and the quadrature signal are offset. Thus, it is possible to maintain the average amount of the delays between the in-phase signal and the quadrature signal at a substantially constant. Thereby, it is possible to reduce the effect of dithering for the delay amount control as described above when carrying out processing, such as clock extraction, from the average value of the real number component (in-phase signal) and the imaginary number component (quadrature signal) at the DSP 9B.

Ninth Embodiment

Figure 18:
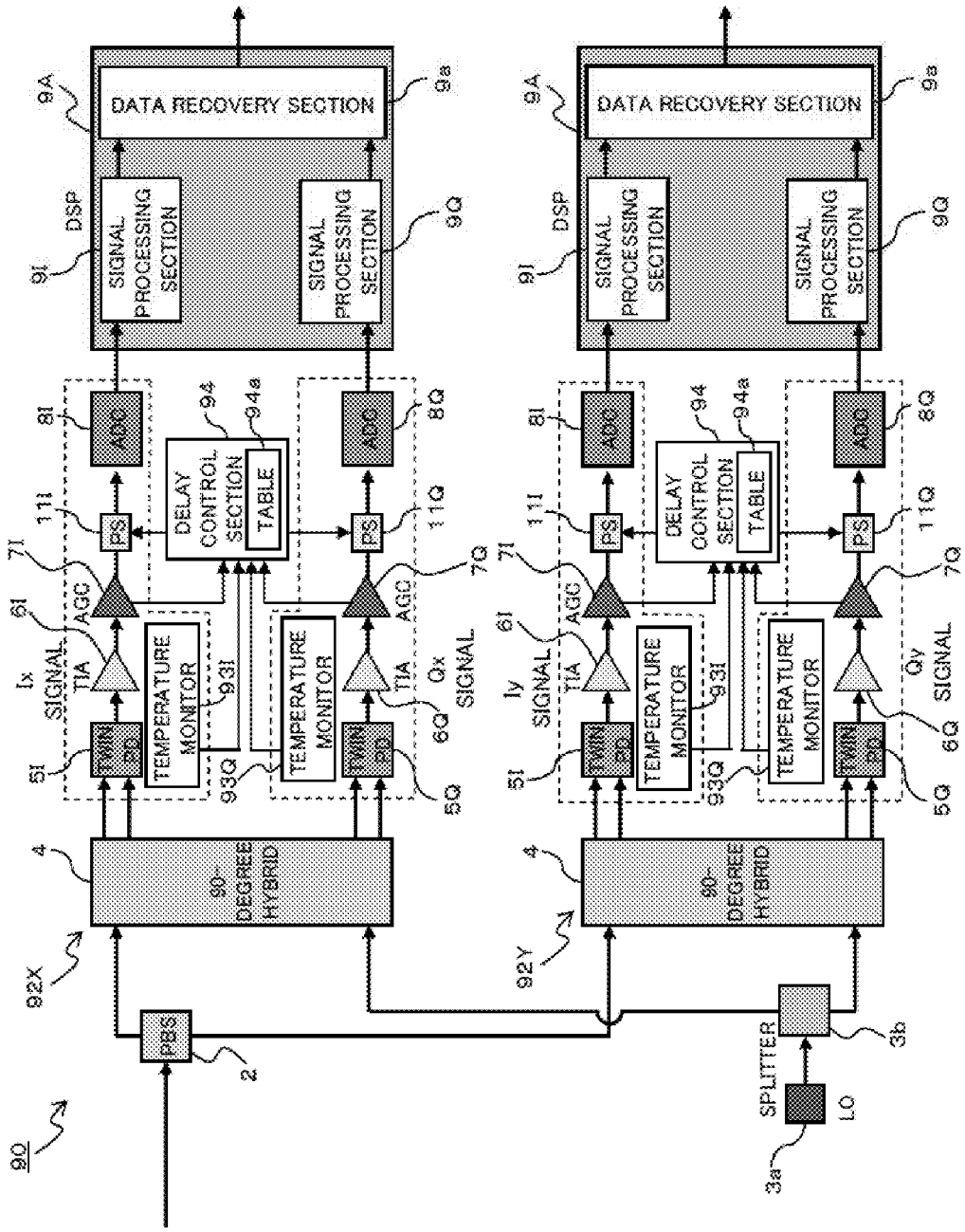
FIG. 18 is a diagram illustrating a ninth embodiment.

FIG. 18 is a diagram illustrating a ninth embodiment. A coherent receiver 90 illustrated in FIG. 18 also includes signal demodulation processing systems 92X and 92Y that are different from those in the case of the embodiments, together with the PBS 2, the local oscillator 3a, and the splitter 3b for receiving an optical signal as that in the case of the first embodiment.

The signal demodulation processing systems 92X and 92Y both include the above-described components references to by the reference symbols 4-8, 9A, and 11, and further include temperature monitors 93I and 93Q and a delay control section 94. Hereinafter, although explanations will be given with reference to the signal demodulation processing system 92X, the similar description can be applied to the signal demodulation processing system 92Y.

Here, referring to the signal demodulation processing system 92X, the temperature monitor 93I monitors temperature properties at components 4I-7I related to in-phase signals and connections between them. Similarly, the temperature monitor 93Q monitors temperature properties at components 4Q-7Q related to quadrature signals and connections. Temperature property information that is monitored by the temperature monitors 93I and 93Q is output to the delay control section 94.

The delay control section 94 controls appropriate phase shift values for the phase-shifters 11I and 11Q in response to receiving temperature monitored values from the temperature monitors 93I and 93Q and gain values from the AGCs 7I and 7Q. For this purpose, the delay control section 94 includes a table 94a, for example.

The table 94a stores relations of information on delay amounts (phase shift values) to the phase-shifters 11I and 11Q in accordance with temperature properties propagate electric elements 5-7 that propagate the in-phase signal and the quadrature signal and connections between them, and the gain values from the AGCs 7I and 7Q. That is, the table 94a stores, as the control amounts to the phase-shifters 11I and 11Q, values that optimize (minimize, for example) the delay difference between the in-phase analog signal and the orthogonal analog signal input into the ADCs 8I and 8Q in accordance with the temperature properties of the electric elements 5-7 and the gain property of the AGC 7.

The delay control section 94 receives monitor results from the temperature monitors 93I and 93Q and gain values related to an automatic gain control from the AGCs 7I and 7Q. The delay control section 94 then extracts a delay amount of one or both of the phase-shifters 11I and 11Q corresponding to the above-described monitor results and gain values. Furthermore, the delay control section 94 controls the phase-shifters 11I and 11Q using the delay amounts retrieved from the table 94a. Thereby, it is possible to appropriately control delay difference between the in-phase analog signal and the orthogonal analog signal input into the ADCs 8I and 8Q.

The advantage similar to that of the case of the first embodiment is also obtained in this case.

In addition, for the phase-shifters 11I and 11Q and the delay control section 94, various modularizations may be applied as in the modes exemplified in FIGS. 5-9.

Tenth Embodiment

Figure 19:
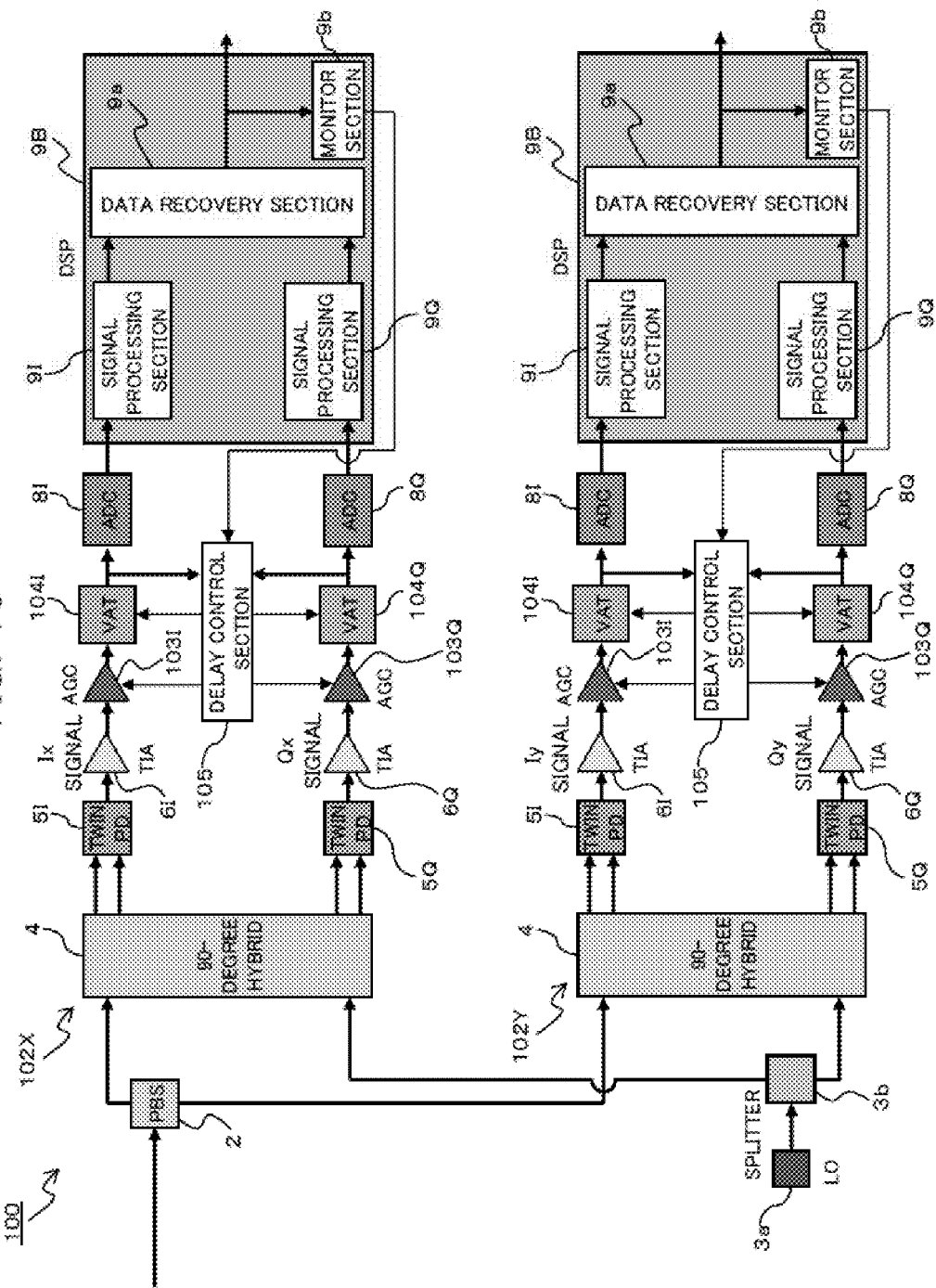
FIG. 19 is a diagram illustrating a tenth embodiment.

FIG. 19 is a diagram illustrating a tenth embodiment. A coherent receiver 100 illustrated in FIG. 19 also includes signal demodulation processing systems 102X and 102Y that is different from those in the case of the embodiments, together with the PBS 2, the local oscillator 3a, and the splitter 3b for receiving an optical signal as that in the case of the first embodiment.

The signal demodulation processing systems 102X and 102Y both include the above-described components references to by the reference symbols 4-6, 8, and 9B, and further include AGCs 103I and 103Q, variable attenuators (VATS) 104I and 104Q, and a delay control section 105. Hereinafter, although explanations will be given with reference to the signal demodulation processing system 102X, the similar description can be applied to the signal demodulation processing system 102Y.

Here, referring to the signal demodulation processing system 102X, the AGCs 103I and 103Q are subjected to an automatic gain control from the delay control section 105, and amplify the in-phase signal and the quadrature signal from the TIAs 6I and 6Q. A delay time difference may be included in output signals of the AGCs 103I and 103Q caused by the difference between gain setting values of the AGCs 103I and 103Q. The tenth embodiment controls such that the delay difference between the in-phase signal and the quadrature signal that are output is optimized (for example, delay difference becomes zero) by setting respective gains to the AGCs 103I and 103Q.

Furthermore, the VATs 104I and 104Q are subjected to a control from the delay control section 105, and carry out variable attenuation control on the in-phase signal from the AGC 103I and the quadrature signal from the AGC 103Q. Although the in-phase signal and the quadrature signal are amplified with the gains that are controlled for the delay amount controls at the AGCs 103I and 103Q, the difference in the levels due to the difference between the gains of the AGCs 103I and 103Q are reduced by carrying out variable attenuation on signal at the VATs 104I and 104Q.

The delay control section 105 controls the gains for the AGCs 103I and 103Q based on the monitored values received from the monitor section 9b in the DSP 9B. Thereby, it is possible to optimize (to set to zero, for example) the delay amount between the in-phase analog signal and the orthogonal analog signal input into the ADCs 8I and 8Q. In addition, the delay control section 105 controls, based on the monitored value, the variable attenuation amounts to the VATs 104I and 104Q in accordance with the above-described gain controls to the AGCs 103I and 103Q. Thereby, it is possible to optimize (to become the same, for example) the level differences between the in-phase analog signal and the orthogonal analog signal input into the ADCs 8I and 8Q.

Accordingly, the advantages the same as in the case of the first embodiment can be obtained in this case.

In addition, for the AGCs 103I and 103Q, the VATs 104I and 104Q, and the delay control section 105, various modularizations may be applied as in the modes exemplified in FIGS. 5-9.

Eleventh Embodiment

Figure 20:
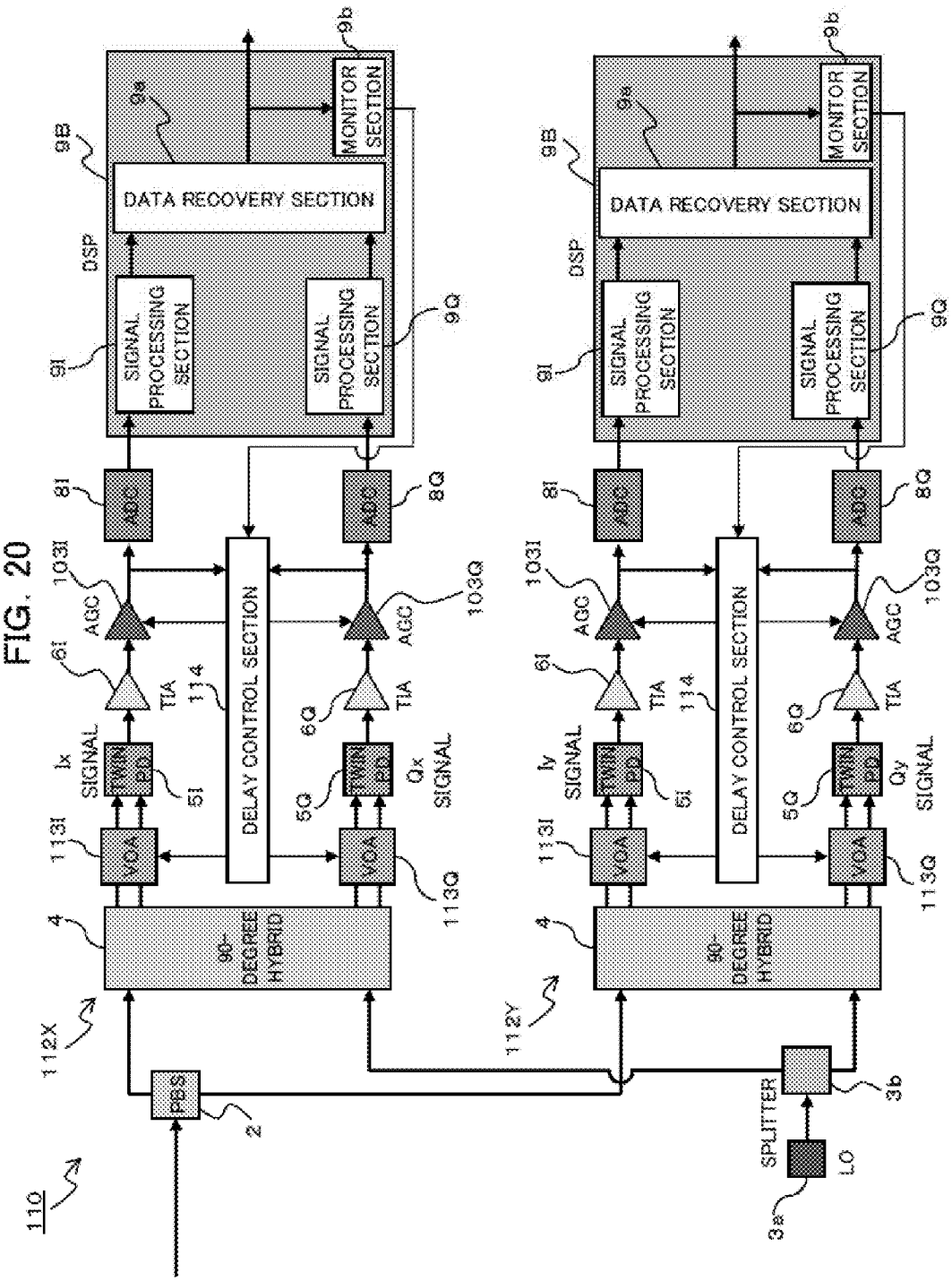
FIG. 20 is a diagram illustrating an eleventh second embodiment.

FIG. 20 is a diagram illustrating an eleventh embodiment. A coherent receiver 110 illustrated in FIG. 20 also includes signal demodulation processing systems 112X and 112Y that are different from those in the case of the tenth embodiment, together with the PBS 2, the local oscillator 3a, and the splitter 3b for receiving an optical signal as that in the case of the first embodiment.

The signal demodulation processing systems 112X and 112Y include variable optical attenuators (VOAs) 113I and 113Q and a delay control section 114, respectively, instead of the VATs 104I and 104Q as in the tenth embodiment described above. Other components referenced to by the reference symbols 4-6, 8, 9, and 103 are similar to the corresponding components in the above-described tenth embodiment. Hereinafter, although explanations will be given with reference to the signal demodulation processing system 112X, the similar description can be applied to the signal demodulation processing system 112Y.

Referring to the signal demodulation processing system 112X, VOAs 113I and 113Q are inserted between the 90-degree hybrid circuit 4 and the twin PDs 5I and 5Q, respectively. The VOA 113I carries out variable attenuation on the in-phase optical signal from the 90-degree hybrid circuit 4 the basis of a control from the delay control section 114, and directs the signal to the twin PDs 5I. Similarly, the VOA 113Q carries out variable attenuation on the orthogonal optical signal from the 90-degree hybrid circuit 4 on the basis of a control from the delay control section 114, and directs the signal to the twin PDs 5Q.

The delay control section 114 controls the gains for the AGCs 103I and 103Q based on the monitored values received from the monitor section 9b in the DSP 9B. Thereby, it is possible to optimize (to set to zero, for example) the delay amount between the in-phase analog signal and the orthogonal analog signal input into the ADCs 8I and 8Q.

In addition, the delay control section 114 controls, based on the monitored value from the monitor section 9b, the optical variable attenuation amounts to the VOAs 113I and 113Q in accordance with the above-described gain controls to the AGCs 103I and 103Q. Thereby, it becomes possible to control delay differences between the in-phase analog signal and the orthogonal analog signal input into the ADCs 8I and 8Q.

Accordingly, the advantages the same as in the case of the first embodiment described above can be obtained in this case.

Others

Without being limited to the above-identified embodiments, the present invention may be implemented in various manner without departing from the spirit thereof, such as various aspects of the embodiments.

For example, receivers according to the dual polarization-(differential) phase shift keying (DP-(D)QPSK) scheme which multiplex multi-level phase modulation signals into two linearly polarized components that are orthogonal with each other in the above-described embodiments. However, a single polarization scheme without employing polarization division multiplexing, or multi-level phase modulation schemes of greater than four may be used as receivers of aspects of the embodiments.

Furthermore, the direct reception scheme illustrated in FIG. 10 may be applied to aspects of other embodiments.

In addition, although delay amounts are given to both of the in-phase signal and the quadrature signal in the above-described embodiments, a delay amount may be provided to either one of the quadrature signal and the in-phase signal.

Furthermore, for example, it may be useful to apply a temperature control device that stabilizes the temperatures to a target temperature in accordance with the temperature monitor in order to reduce a dependency of delay time on the temperature at components located from the output of the 90-degree hybrid circuit 4 to the ADCs 8I and 8Q. That is, by temperature control by the temperature control device, it is possible to suppress the delay difference between the in-phase analog signal and the orthogonal analog signal input into the above-described ADCs 8I and 8Q.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has (have) been described in detail, it should be understood that the various changes, substitutions, and alterations could be made hereto without departing from the spirit and scope of the invention.

What is claimed is:

1. A delay processing apparatus that is used with an analog-digital converter that converts, into digital signals, an in-phase signal and a quadrature signal that are obtained by demodulating multi-level phase modulated light, and a processor that carries out digital signal processing on the digital signals from the analog-digital converter to recover data, the delay processing apparatus comprising:
    a delay device that provides a delay amount to at least one of the in-phase signal and the quadrature signal; and
    a delay control section that provides a feedback control on the delay amount provided by the delay device based on a quality of the signals when the in-phase signal and the quadrature signal, to the at least one of which the delay amount is provided at the delay device, are converted into digital signals by the analog-digital converter, and the digital signal processing is carried out at the processor.

2. The delay processing apparatus according to claim 1, wherein the delay control section provides the feedback control on the delay amount based on the quality of the signals calculated through the signal processing.

3. The delay processing apparatus according to claim 1, wherein the delay control section receives, from the processor, a correlation value between the in-phase signal and the quadrature signal that are converted into the digital signals as a result of the signal processing, and provides the feedback control on the delay amount based on the correlation value.

4. The delay processing apparatus according to claim 1, wherein the delay device, for at least one of the in-phase signal and the quadrature signal that are input as an electric signal or an optical signal, outputs an electric signal or an optical signal to which the delay is provided.

5. The delay processing apparatus according to claim 1, wherein the delay device comprises an amplifier that amplifies at least one of the in-phase signal and the quadrature signal with variable gain and provides a time delay corresponding to the gain.

6. A signal amplification apparatus that is used with an analog-digital converter that converts, into digital signals, an in-phase signal and a quadrature signal that are obtained by demodulating multi-level phase modulated light, and a processor that carries out digital signal processing on the digital signals from the analog-digital converter to recover data, the signal amplification apparatus comprising:
    an amplification section that carries out amplification processing independently on the in-phase signal and the quadrature signal in analog electric signals;
    a delay device that provides a delay amount to at least one of the in-phase signal and the quadrature signal at the previous stage or the subsequent stage of the amplification section; and
    a delay control section that provides a feedback control on the delay amount provided by the delay device based on a quality of the signals when the in-phase signal and the quadrature signal, to the at least one of which the delay amount is provided the delay device, are converted into digital signals by the analog-digital converter, and the digital signal processing is carried out at the processor.

7. An opto-electric conversion apparatus that is used with an analog-digital converter that converts, into digital signals, an in-phase signal and a quadrature signal that are obtained by demodulating multi-level phase modulated light, and a processor that carries out digital signal processing on the digital signals from the analog-digital converter to recover data, the opto-electric conversion apparatus comprising:
    an opto-electric conversion section that converts the in-phase signal and the quadrature signal into respective electric signals through opto-electric conversion processing;
    a delay device that provides a delay amount to at least one of the in-phase signal and the quadrature signal at the previous stage or the subsequent stage of the opto-electric conversion processing; and
    a delay control section that provides a feedback control on the delay amount provided by the delay device based on a quality of the signals when the in-phase signal and the quadrature signal, to the at least one of which the delay amount is provided at the delay device, are converted into digital signals by the analog-digital converter, and the digital signal processing is carried out at the processor.

8. An analog-digital conversion apparatus that is used with a processor carrying out digital signal processing on digital signals from the analog-digital conversion apparatus to recover data, the analog-digital conversion apparatus comprising:
    an analog-digital conversion section that converts the in-phase signal and the quadrature signal into respective digital electric signals through analog-digital conversion processing;
    a delay device that provides a delay amount to at least one of the in-phase signal and the quadrature signal of the analog electric signals at the previous stage or the subsequent stage of the analog-digital conversion processing; and
    a delay control section that provides a feedback control on the delay amount provided by the delay device based on a quality of the signals when the in-phase signal and the quadrature signal, to the at least one of which the delay amount is provided at the delay device, is converted into the digital signals by the analog-digital conversion section, and the digital signal processing is carried out at the processor.

9. A receiving apparatus, comprising:
a receiver unit that receives a multi-level phase modulated light and outputs an in-phase signal and a quadrature signal;
a delay device that provides a delay amount to at least one of the in-phase signal and the quadrature signal from the reception section,
a delay control section that provides a feedback control on the delay amount provided by the delay device based on a quality of the signals when the at least one of the in-phase signal and the quadrature signal to which delay amount is provided at the delay device is converted into the digital signals by an analog-digital conversion section, and the digital signal processing is carried out at a processor.

10. The receiving apparatus according to claim 9, wherein:
the receiver unit outputs the in-phase signal and the quadrature signal as optical signals,
the delay device outputs optical signals to which the delay amount is provided to at least one of the in-phase signal and the quadrature signal that are input as the optical signals, and
the receiving apparatus further comprises opto-electric conversion section that outputs the in-phase signal and the quadrature signal, to the at least one of which the delay amount is provided at the delay device, as respective analog electric signals through opto-electric conversion processing.

11. The receiving apparatus according to claim 9, further comprising:
an opto-electric conversion section that converts the in-phase signal and the quadrature signal of the optical signals output from the receiver unit into respective analog electric signals through opto-electric conversion processing; and
an amplification section that carries out amplification processing on the in-phase signal and the quadrature signal of the analog electric signals from the opto-electric conversion section,
wherein the delay device provides the delay amount to at least one of the in-phase signal or the quadrature signal of the analog electric signals at the previous stage of the amplification processing at the amplification section, or at least one of the in-phase signal or the quadrature signal of the analog electric signals at the subsequent stage of the amplification processing at the amplification section.

12. The receiving apparatus according to claim 10, further comprising an analog-digital conversion section that converts the in-phase signal and the quadrature signal, the at least one of the analog electric signals of which is provided with the delay amount, as digital signals.

13. The receiving apparatus according to claim 12, further comprises:
a digital signal processing section that carries out digital signal processing on the in-phase signal and the quadrature signal that are output from the analog-digital conversion section as the digital signals,
wherein the delay control section provides the feedback control on the delay amount at the delay device based on a result of the signal processing at the digital signal processing section.

14. A receiving apparatus, comprising:
a front-end section that receives a multi-level phase modulated optical signal and outputs an in-phase signal and a quadrature signal of an analog electric signal;
a delay device that provides a delay amount to at least one of the in-phase signal and the quadrature signal;
a plurality of analog-digital conversion sections that input the in-phase signal and the quadrature signal, the at least one of which is provided with the delay amount by the delay device;
a digital signal processing section that carries out digital signal processing on the output from the analog-digital conversion section; and
a delay control section that provides a feedback control on the delay amount at the delay device based on a result of the digital signal processing at the digital signal processing section.

15. The receiving apparatus according to claim 14, wherein the digital signal processing section comprises:
a distortion compensation processing section that carries out processing to compensate for a waveform distortion on an output from the analog-digital conversion section in accordance with the in-phase signal and the quadrature signal;
a data recovery section that recovers data based on an output from the distortion compensation processing section; and
a monitor section that monitors an indicative value that indicates an input timing offset of the in-phase signal and the quadrature signal between an output from the distortion compensation processing section or an output from the data recovery section and an input to the analog-digital conversion section,
wherein the delay control section provides the feedback control on the delay amount based on an output from the monitor section.

16. A receiving apparatus, comprising:
a receiver unit that receives a multi-level phase modulated light and outputs an in-phase signal and a quadrature signal as optical signals;
an opto-electric conversion section that converts the in-phase signal and the quadrature signal of the optical signals output from the receiver unit into respective analog electric signals through opto-electric conversion processing;
an amplification section that carries out amplification processing on the in-phase signal and the quadrature signal of the analog electric signals from the opto-electric conversion section;
a delay device that provides a delay amount to at least one of the in-phase signal and the quadrature signal from the reception section;
a temperature monitor that monitors temperatures at the opto-electric conversion section and the amplification section; and
a delay control section that stores the temperatures at the opto-electric conversion section and the amplification section, and information on the delay amount to be set to at least one of the in-phase signal and the quadrature signal at the delay device in accordance with a gain at the amplification section, retrieves, from the store, the information on the delay amount corresponding to a monitor result from the temperature monitor and the gain at the amplification section, and controls the delay device in accordance with the retrieved delay amount.

17. A receiving method, comprising:

receiving a multi-level phase modulated light and outputs an in-phase signal and a quadrature signal;

providing a delay amount to at least one of the in-phase signal and the quadrature signal;

converting the in-phase signal and the quadrature signal, to the at least one of which the delay amount is provided, into digital signals, and carrying out signal processing, and providing a feedback control on the provided delay amount based on a result of the signal processing.

18. A delay processing apparatus, comprising:

a delay section that provides variable time delay to at least one of an in-phase signal and a quadrature signal originating from multi-level phase modulated light; and a delay control section that provides a feedback control on a delay amount at the delay section based on a result of a conversion of the in-phase signal and the quadrature signal including the signal to which the delay is provided at the delay section into digital signals and signal processing thereon.

19. A signal amplification apparatus, comprising:

an amplification section that carries out amplification processing on an in-phase signal and a quadrature signal of an analog electric signal originating from multi-level phase modulated light;

a delay section that provides a variable time delay to at least one of the in-phase signal and the quadrature signal at the previous stage or the subsequent stage of the amplification processing; and a delay control section that provides a feedback control on a delay amount at the delay section based on a result of a conversion of the in-phase signal and the quadrature signal including the signal to which the delay is provided at the delay section into digital signals and signal processing thereon.

20. An opto-electric conversion apparatus, comprising:

an opto-electric conversion section that converts an in-phase signal and a quadrature signal of optical signals originating from multi-level phase modulated light to respective analog electric signals through opto-electric conversion processing; and a delay section that provides a variable time delay to at least one of the in-phase signal and the quadrature signal at the previous stage or the subsequent stage of the opto-electric conversion processing; and a delay control section that provides a feedback control on a delay amount at the delay section based on a result of a conversion of the in-phase signal and the quadrature signal including the signal to which the delay is provided at the delay section into digital signals and signal processing thereon.

* * * * *